United States Patent
Chen et al.

(10) Patent No.: US 9,986,044 B2
(45) Date of Patent: May 29, 2018

(54) MULTI-SCREEN INTERACTION METHOD, DEVICES, AND SYSTEM

(71) Applicant: Huawei Technologies Co., Ltd., Shenzhen (CN)

(72) Inventors: Qiulin Chen, Shanghai (CN); Bo Huang, Hangzhou (CN); Jianhua Zhu, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 461 days.

(21) Appl. No.: 14/536,279

(22) Filed: Nov. 7, 2014

(65) Prior Publication Data

US 2015/0113037 A1    Apr. 23, 2015

Related U.S. Application Data

(63) Continuation of application No. PCT/CN2014/076301, filed on Apr. 25, 2014.

(30) Foreign Application Priority Data

Oct. 21, 2013  (CN) .......................... 2013 1 0497254

(51) Int. Cl.
   *H04L 29/08*   (2006.01)
(52) U.S. Cl.
   CPC .......... *H04L 67/16* (2013.01); *H04L 67/2823* (2013.01)
(58) Field of Classification Search
   CPC ....................................................... H04L 67/16
   (Continued)

(56) References Cited

U.S. PATENT DOCUMENTS 4,574,364 A * 3/1986 Tabata ..................... G09G 5/14
                                                      345/662
6,567,848 B1 * 5/2003 Kusuda ............... G06Q 20/108
                                                      379/93.01
(Continued)

FOREIGN PATENT DOCUMENTS

CN         101517975 A      8/2009
CN         102377823 A      3/2012
                (Continued)

OTHER PUBLICATIONS

Wi-Fi Alliance, "Wi-Fi Peer-to-Peer (P@P) Technical Specification Version 1.2", 2010.*

*Primary Examiner* — O. C. Vostal
(74) *Attorney, Agent, or Firm* — Slater Matsil, LLP

(57) ABSTRACT

A multi-screen interaction method, devices, and system are provided. The method includes acquiring a first message from a first terminal device. The first message includes a first operation instruction and first state information. A second message is acquired from a second terminal device. The second message includes a second operation instruction. The method further includes searching, according to the second operation instruction, for an operation instruction that is matched with the second operation instruction, among stored operation instructions. A first control instruction is sent to the first terminal device and a second control instruction is sent to the second terminal device, if it is found that the second operation instruction is matched with the first operation instruction.

26 Claims, 11 Drawing Sheets

(58) Field of Classification Search
USPC .......................................................... 709/201
See application file for complete search history.

(56) References Cited

U.S. PATENT DOCUMENTS

| | | | |
|---|---|---|---|
| 6,678,715 B1* | 1/2004 | Ando | G06F 9/4862 709/201 |
| 6,816,129 B1* | 11/2004 | Zimmerman | G06F 3/1431 340/1.1 |
| 7,237,108 B2* | 6/2007 | Medvinsky | G06F 21/10 380/200 |
| 7,653,735 B2* | 1/2010 | Mandato | H04L 12/5695 709/205 |
| 7,840,593 B2* | 11/2010 | Nomura | H04L 67/16 707/770 |
| 7,860,923 B2* | 12/2010 | Singer | H04L 63/0823 709/203 |
| 7,934,010 B2* | 4/2011 | Foster | H04L 29/06027 709/230 |
| 8,135,850 B2* | 3/2012 | Narayana | H04L 65/1083 370/338 |
| 8,200,223 B2* | 6/2012 | Harada | H04W 36/02 370/235 |
| 8,588,860 B2* | 11/2013 | Sirpal | G06F 1/1616 345/1.1 |
| 8,615,574 B2* | 12/2013 | Ji | H04L 43/00 709/201 |
| 8,666,394 B1* | 3/2014 | Montemurro | H04W 4/08 370/254 |
| 8,990,273 B2* | 3/2015 | Iarocci | H04L 67/16 455/403 |
| 9,009,310 B1* | 4/2015 | DeRosia | H04L 12/1464 709/225 |
| 9,009,984 B2* | 4/2015 | Caskey | G06F 1/1616 33/303 |
| 9,047,038 B2* | 6/2015 | Sirpal | G06F 3/1438 |
| 9,092,184 B2* | 7/2015 | Buchner | G06F 3/1446 |
| 9,167,512 B2* | 10/2015 | Ryerson | H04W 48/18 |
| 9,223,561 B2* | 12/2015 | Orveillon | G06F 8/63 |
| 9,413,803 B2* | 8/2016 | Huang | H04L 65/608 |
| 9,437,158 B2* | 9/2016 | Lin | G06F 3/1454 |
| 9,525,998 B2* | 12/2016 | Sheth | H04L 67/38 |
| 2003/0065917 A1 | 4/2003 | Medvinsky et al. | |
| 2003/0177440 A1* | 9/2003 | Kegoya | G05B 19/042 715/273 |
| 2003/0229900 A1* | 12/2003 | Reisman | G06F 17/30873 725/87 |
| 2004/0031058 A1* | 2/2004 | Reisman | G06F 17/30873 725/112 |
| 2005/0155070 A1* | 7/2005 | Slaughter | H04N 7/173 725/86 |
| 2005/0157660 A1* | 7/2005 | Mandato | H04L 12/5695 370/254 |
| 2005/0273489 A1* | 12/2005 | Pecht | G06F 21/10 709/203 |
| 2005/0273508 A1* | 12/2005 | Humpleman | H04L 12/2803 709/223 |
| 2006/0064459 A1* | 3/2006 | Matsushima | H04L 67/025 709/203 |
| 2006/0256778 A1* | 11/2006 | Nakamura | H04L 29/06027 370/352 |
| 2006/0271482 A1* | 11/2006 | Bito | G06F 21/606 705/50 |
| 2006/0294244 A1* | 12/2006 | Naqvi | H04M 7/123 709/227 |
| 2007/0171903 A1* | 7/2007 | Zeng | H04L 29/06027 370/389 |
| 2007/0220323 A1* | 9/2007 | Nagata | G06F 11/2025 714/13 |
| 2008/0162714 A1* | 7/2008 | Pettersson | H04L 65/80 709/231 |
| 2008/0195730 A1* | 8/2008 | Hasegawa | H04W 4/02 709/224 |
| 2008/0232288 A1* | 9/2008 | Venkatachalam | H04W 76/045 370/311 |
| 2009/0061927 A1* | 3/2009 | Lam | H04L 65/1069 455/556.1 |
| 2009/0094374 A1* | 4/2009 | Lam | H04N 21/643 709/231 |
| 2009/0125609 A1* | 5/2009 | Wood | G06F 17/30017 709/219 |
| 2009/0129341 A1* | 5/2009 | Balasubramanian | H04W 36/0055 370/331 |
| 2009/0177987 A1* | 7/2009 | Jayakody | G06F 3/0482 715/764 |
| 2009/0270102 A1* | 10/2009 | Liu | H04W 36/36 455/436 |
| 2009/0327894 A1* | 12/2009 | Rakib | G11B 27/34 715/719 |
| 2010/0091461 A1* | 4/2010 | Yamanaka | H01L 23/3675 361/709 |
| 2010/0198954 A1* | 8/2010 | Grasso | H04L 12/2809 709/223 |
| 2011/0264753 A1* | 10/2011 | Park | H04L 67/36 709/206 |
| 2012/0066607 A1* | 3/2012 | Song | G06F 9/5077 715/737 |
| 2012/0084681 A1* | 4/2012 | Cassar | G06F 1/1616 715/761 |
| 2012/0084820 A1* | 4/2012 | Wang | H04L 12/189 725/62 |
| 2012/0113468 A1* | 5/2012 | Urakawa | G06F 9/4445 358/1.15 |
| 2012/0117150 A1* | 5/2012 | Jung | H04L 12/189 709/204 |
| 2012/0157102 A1* | 6/2012 | Yang | H04W 36/0016 455/436 |
| 2012/0162355 A1* | 6/2012 | Cheng | H04L 12/1827 348/14.08 |
| 2012/0209934 A1* | 8/2012 | Smedman | H04L 12/5692 709/208 |
| 2012/0226768 A1* | 9/2012 | Gaines | G06F 19/3418 709/217 |
| 2012/0303741 A1* | 11/2012 | Sugaya | H04L 41/0816 709/217 |
| 2012/0329390 A1* | 12/2012 | Kim | H04W 4/008 455/41.1 |
| 2012/0329430 A1* | 12/2012 | Chatani | H04L 12/12 455/411 |
| 2013/0031601 A1* | 1/2013 | Bott | G06F 21/552 726/1 |
| 2013/0035138 A1* | 2/2013 | Abbott | H04L 67/36 455/566 |
| 2013/0100348 A1* | 4/2013 | Chen | H04N 7/0885 348/468 |
| 2013/0132457 A1* | 5/2013 | Diwakar | H04L 67/10 709/201 |
| 2013/0139210 A1* | 5/2013 | Huang | H04W 4/06 725/109 |
| 2013/0198342 A1* | 8/2013 | Xu | H04L 65/60 709/219 |
| 2013/0238702 A1 | 9/2013 | Sheth et al. | |
| 2013/0275615 A1* | 10/2013 | Oyman | H04L 65/60 709/231 |
| 2013/0304850 A1* | 11/2013 | Mahaffey | H04L 41/0253 709/217 |
| 2013/0324097 A1* | 12/2013 | Roberts | H04W 4/001 455/418 |
| 2014/0020010 A1* | 1/2014 | Fan | H04N 21/4227 725/25 |
| 2014/0073244 A1* | 3/2014 | Ko | H04W 4/008 455/41.1 |
| 2014/0168277 A1* | 6/2014 | Ashley | G06F 3/1446 345/672 |
| 2014/0219088 A1* | 8/2014 | Oyman | H04N 21/23439 370/231 |
| 2014/0258357 A1* | 9/2014 | Singh | H04L 67/10 709/201 |

(56) References Cited

U.S. PATENT DOCUMENTS

| | | | | |
|---|---|---|---|---|
| 2014/0366117 A1* | 12/2014 | Kumar | .................... | H04L 63/02 |
| | | | | 726/11 |
| 2015/0062022 A1* | 3/2015 | Rabii | ....................... | G06T 1/20 |
| | | | | 345/173 |
| 2015/0100461 A1* | 4/2015 | Baryakar | ............. | G05D 1/0038 |
| | | | | 705/26.43 |
| 2015/0172743 A1* | 6/2015 | Itagaki | .................... | G08C 17/00 |
| | | | | 725/56 |
| 2015/0222688 A1* | 8/2015 | Vedula | .................. | H04W 76/02 |
| | | | | 709/231 |

FOREIGN PATENT DOCUMENTS

| | | |
|---|---|---|
| CN | 102866777 A | 1/2013 |
| CN | 103139211 A | 6/2013 |
| CN | 103248956 A | 8/2013 |
| CN | 103260079 A | 8/2013 |
| CN | 103313192 A | 9/2013 |
| CN | 103561315 A | 2/2014 |
| EP | 1845684 A1 | 10/2007 |
| EP | 2833242 A1 | 2/2015 |
| JP | 201268709 A | 4/2012 |
| KR | 1020130067690 A | 6/2013 |

* cited by examiner

MULTI-SCREEN INTERACTION METHOD, DEVICES, AND SYSTEM

This application is a continuation of International Application No. PCT/CN2014/076301, filed on Apr. 25, 2014, which claims priority to Chinese Patent Application No. 201310497254.4, filed on Oct. 21, 2013, both of which are hereby incorporated by reference in their entireties.

TECHNICAL FIELD

The present invention relates to the field of communications and, in particular embodiments, to a multi-screen interaction method, devices, and system.

BACKGROUND

With the progress of science and technology, there are more and more smart terminals, for example, a smart television, a smart phone, and a tablet computer, and along with this, solutions to interconnection between various smart terminals come forth. These interconnection solutions can implement multi-screen interaction between the smart terminals.

In the prior art, implementation of multi-screen interaction specifically includes the following steps. First, a smart terminal discovers devices in a network, and establishes a connection between the smart device and each device; then, a user selects a target device from a device list on an operation interface of a source device, and completes an operation by using an operation instruction; and finally, the source device sends, to the target device by using the established connection, content to be transmitted.

In the process of implementing the foregoing multi-screen interaction, the inventor finds that the prior art has at least the following problem: The user needs to perform multiple steps of selection by using operation instructions on the source device to determine the target device and further implement the multi-screen interaction. Apparently, in this operation manner, there are many steps of user intervention, the operation steps are complicated, and therefore, user experience is reduced.

SUMMARY

Embodiments of the present invention provide a multi-screen interaction method, devices, and system, which are used to simplify operation steps of multi-screen interaction and improve user experience.

To achieve the foregoing objective, the embodiments of the present invention use the following technical solutions.

According to a first aspect, an embodiment of the present invention provides a multi-screen interaction method, including: acquiring a first message from a first terminal device, where the first message includes a first operation instruction and first state information, where the first operation instruction is used to instruct to hand over a first operation currently executed by the first terminal device to a second terminal device for execution, and the first state information is related information of the first operation currently executed by the first terminal device; acquiring a second message from a second terminal device, where the second message includes a second operation instruction, where the second operation instruction is used to instruct to execute, by the second terminal device, the first operation; searching, according to the second operation instruction, for an operation instruction that is matched with the second operation instruction, among stored operation instructions; and sending a first control instruction to the first terminal device and sending a second control instruction to the second terminal device, if it is found that the second operation instruction is matched with the first operation instruction, where the first control instruction is used to instruct the first terminal device to send the related information of the first operation to the second terminal device, and the second control instruction is used to instruct the second terminal device to receive the related information of the first operation sent by the first terminal device.

In a first possible implementation manner of the first aspect, the first message further includes first user identity information, and the second message further includes second user identity information; before the sending a first control instruction to the first terminal device, and sending a second control instruction to the second terminal device if it is found that the second operation instruction is matched with the first operation instruction, the method further includes: searching, according to the second user identity information, for user identity information which is matched with the second user identity information among stored user identity information; and the sending a first control instruction to the first terminal device and sending a second control instruction to the second terminal device, if it is found that the second operation instruction is matched with the first operation instruction includes: if it is found that the second operation instruction is matched with the first operation instruction and it is found that the second user identity information is matched with the first user identity information, sending the first control instruction to the first terminal device and sending the second control instruction to the second terminal device.

With reference to the first aspect or the first possible implementation manner of the first aspect, in a second possible implementation manner of the first aspect, before the acquiring a first message from a first terminal device, the method further includes: receiving device information of the first terminal device and device information of the second terminal device and performing registering on the device information of the first terminal device and the device information of the second terminal device, where the device information of the first terminal device includes connection parameter information of the first terminal device, and the device information of the second terminal device includes connection parameter information of the second terminal device.

With reference to the second possible implementation manner of the first aspect, in a third possible implementation manner of the first aspect, before the acquiring a first message from a first terminal device, the method further includes: receiving a first request message sent by the first terminal device, where the first request message is a message for representing that the first terminal device acquires connection parameter information of a second terminal device; and sending a first response message to the first terminal device, where the connection parameter information of the second terminal device is carried in the first response message.

With reference to the second or third possible implementation manner of the first aspect, in a fourth possible implementation manner of the first aspect, before the acquiring a first message from a first terminal device, the method further includes: receiving a second request message sent by the second terminal device, where the second request message is a message for representing that the second terminal device acquires connection parameter information of a first terminal device; and sending a second response message to the second terminal device, where the connection parameter information of the first terminal device is carried in the second response message.

According to a second aspect, an embodiment of the present invention provides a multi-screen interaction method, including: acquiring first user instruction information; determining a first operation instruction according to the first user instruction information, where the first operation instruction is used to instruct to hand over a first operation currently executed by a first terminal device to a second terminal device for execution; sending a first message to a central device, where the first message includes the first operation instruction and first state information, where the first state information is related information of the first operation currently executed by the first terminal device; receiving a first control instruction sent by the central device, where the first control instruction is used to instruct the first terminal device to send the related information of the first operation to the second terminal device; and sending the related information of the first operation to the second terminal device according to the first control instruction.

In a first possible implementation manner of the second aspect, the first message further includes first user identity information; and before the sending a first message to a central device, the method further includes: acquiring user information, where the user information is information input by a user for identifying the user; and determining the first user identity information according to the user information.

With reference to the second aspect or the first possible implementation manner of the second aspect, in a second possible implementation manner of the second aspect, before the acquiring first user instruction information, the method further includes: sending device information to the central device, where the device information includes connection parameter information of the first terminal device.

With reference to the second possible implementation manner of the second aspect, in a third possible implementation manner of the second aspect, before the acquiring first user instruction information, the method further includes: sending a first request message to the central device, where the first request message is a message for representing that the first terminal device acquires connection parameter information of a second terminal device; receiving a first response message sent by the central device, where the connection parameter information of the second terminal device is carried in the first response message; and establishing a service connection with the second terminal device according to the first response message.

According to a third aspect, an embodiment of the present invention provides a multi-screen interaction method, including: acquiring second user instruction information; determining a second operation instruction according to the second user instruction information, where the second operation instruction is used to instruct to execute, by the second terminal device, the first operation; sending a second message to a central device, where the second message includes the second operation instruction; receiving a second control instruction sent by the central device, where the second control instruction is used to instruct the second terminal device to receive related information of the first operation sent by a first terminal device; receiving, according to the second control instruction, the related information of the first operation sent by the first terminal device; and executing the first operation according to the received related information of the first operation.

In a first possible implementation manner of the third aspect, the second message further includes second user identity information; and before the sending a second message to the central device, the method further includes: acquiring user information, where the user information is information input by a user for identifying the user; and determining the second user identity information according to the user information.

With reference to the third aspect or the first possible implementation manner of the third aspect, in a second possible implementation manner of the third aspect, before the acquiring first user instruction information, the method further includes: sending device information to the central device, where the device information includes connection parameter information of the second terminal device.

With reference to the second possible implementation manner of the third aspect, in a third possible implementation manner of the third aspect, before the acquiring first user instruction information, the method further includes: sending a second request message to the central device, where the second request message is a message for representing that the second terminal device acquires connection parameter information of a first terminal device; receiving a second response message sent by the central device, where the connection parameter information of the first terminal device is carried in the second response message; and establishing a service connection with the first terminal device according to the second response message.

According to a seventh aspect, an embodiment of the present invention provides a central device, including: a processor, configured to acquire a first message from a first terminal device, where the first message includes a first operation instruction and first state information, where the first operation instruction is used to instruct to hand over a first operation currently executed by the first terminal device to a second terminal device for execution, and the first state information is related information of the first operation currently executed by the first terminal device; the processor, further configured to acquire a second message from a second terminal device, where the second message includes a second operation instruction, where the second operation instruction is used to instruct to execute, by the second terminal device, the first operation; the processor, further configured to search, according to the second operation instruction, for an operation instruction that is matched with the second operation instruction, among stored operation instructions; and a transmitter, configured to send a first control instruction to the first terminal device and send a second control instruction to the second terminal device if the processor finds that the second operation instruction is matched with the first operation instruction, where the first control instruction is used to instruct the first terminal device to send the related information of the first operation to the second terminal device, and the second control instruction is used to instruct the second terminal device to receive the related information of the first operation sent by the first terminal device.

In a first possible implementation manner of the seventh aspect, the first message further includes first user identity information, and the second message further includes second user identity information; the processor is specifically configured to search, according to the second user identity information, for user identity information which is matched with the second user identity information among stored user identity information; and the transmitter is specifically configured to: if the processor finds that the second operation instruction is matched with the first operation instruction and finds that the second user identity information is matched with the first user identity information, send the first control instruction to the first terminal device and send the second control instruction to the second terminal device.

With reference to the seventh aspect or the first possible implementation manner of the seventh aspect, in a second possible implementation manner of the seventh aspect, the central device further includes a receiver, where the receiver is configured to receive device information of the first terminal device and device information of the second terminal device, where the device information of the first terminal device includes connection parameter information of the first terminal device, and the device information of the second terminal device includes connection parameter information of the second terminal device; and the processor is further configured to register the device information of the first terminal device and the device information of the second terminal device.

With reference to the second possible implementation manner of the seventh aspect, in a third possible implementation manner of the seventh aspect, the receiver is further configured to receive a first request message sent by the first terminal device, where the first request message is a message for representing that the first terminal device acquires connection parameter information of a second terminal device; and the transmitter is further configured to send a first response message to the first terminal device, where the connection parameter information of the second terminal device is carried in the first response message.

With reference to the second or third possible implementation manner of the seventh aspect, in a fourth possible implementation manner of the seventh aspect, the receiver is further configured to receive a second request message sent by the second terminal device, where the second request message is a message for representing that the second terminal device acquires connection parameter information of a first terminal device; and the transmitter is further configured to send a second response message to the second terminal device, where the connection parameter information of the first terminal device is carried in the second response message.

According to an eighth aspect, an embodiment of the present invention provides a terminal device, including: a processor, configured to acquire first user instruction information; the processor, further configured to determine a first operation instruction according to the first user instruction information, where the first operation instruction is used to instruct to hand over a first operation currently executed by a first terminal device to a second terminal device for execution; a transmitter, configured to send a first message to a central device, where the first message includes the first operation instruction and first state information, where the first state information is related information of the first operation currently executed by the first terminal device; and a receiver, configured to receive a first control instruction sent by the central device, where the first control instruction is used to instruct the first terminal device to send the related information of the first operation to the second terminal device, where the transmitter is further configured to send the related information of the first operation to the second terminal device according to the first control instruction.

In a first possible implementation manner of the eighth aspect, the first message further includes first user identity information; the processor is further configured to acquire user information, where the user information is information input by a user for identifying the user; and the processor is further configured to determine the first user identity information according to the user information.

With reference to the eighth aspect or the first possible implementation manner of the eighth aspect, in a second possible implementation manner of the eighth aspect, the transmitter is further configured to send device information to the central device, where the device information includes connection parameter information of the first terminal device.

With reference to the second possible implementation manner of the eighth aspect, in a third possible implementation manner of the eighth aspect, the transmitter is further configured to send a first request message to the central device, where the first request message is a message for representing that the first terminal device acquires connection parameter information of a second terminal device; the receiver is further configured to receive a first response message sent by the central device, where the connection parameter information of the second terminal device is carried in the first response message; and the processor is further configured to establish a service connection with the second terminal device according to the first response message.

According to a ninth aspect, an embodiment of the present invention provides a terminal device, including: a processor, configured to acquire second user instruction information; the processor, further configured to determine a second operation instruction according to the second user instruction information, where the second operation instruction is used to instruct to execute, by the second terminal device, the first operation; a transmitter, configured to send a second message to a central device, where the second message includes the second operation instruction; a receiver, configured to receive a second control instruction sent by the central device, where the second control instruction is used to instruct the second terminal device to receive related information of the first operation sent by a first terminal device; the receiver, further configured to receive, according to the second control instruction, the related information of the first operation sent by the first terminal device; and the processor, further configured to execute the first operation according to the related information of the first operation received by the receiver.

In a first possible implementation manner of the ninth aspect, the second message further includes second user identity information; the processor is further configured to acquire user information, where the user information is information input by a user for identifying the user; and the processor is further configured to determine the second user identity information according to the user information acquired by the acquiring unit.

With reference to the ninth aspect or the first possible implementation manner of the ninth aspect, in a second possible implementation manner of the ninth aspect, the transmitter is further configured to send device information to the central device, where the device information includes connection parameter information of the second terminal device.

With reference to the second possible implementation manner of the ninth aspect, in a third possible implementation manner of the ninth aspect, the transmitter is further configured to send a second request message to the central device, where the second request message is a message for representing that the second terminal device acquires connection parameter information of a first terminal device; the receiver is further configured to receive a second response message sent by the central device, where the connection parameter information of the first terminal device is carried in the second response message; and the processor is further configured to establish a service connection with the first terminal device according to the second response message received by the receiver.

According to a tenth aspect, an embodiment of the present invention provides a multi-screen interaction system, including a central device, a first terminal device, and a second terminal device, where the central device is the central device in the fourth aspect or seventh aspect of the present invention; the first terminal device is the terminal device in the fifth aspect or eighth aspect of the present invention; and the second terminal device is the terminal device in the sixth aspect or ninth aspect of the present invention.

The embodiments of the present invention provide a multi-screen interaction method, devices, and system. A central device receives a message sent by a first terminal device and a message sent by a second terminal device, then matches operation instructions included in the messages, and after the matching succeeds, sends a first control instruction to the first terminal device and sends a second control instruction to the second terminal device, so that an operation on the first terminal device is handed over to the second terminal device. In this way, in a multi-screen interaction process, a process of matching by a user can be changed to a process of matching by a central device, thereby simplifying operation steps of the user and improving user experience.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
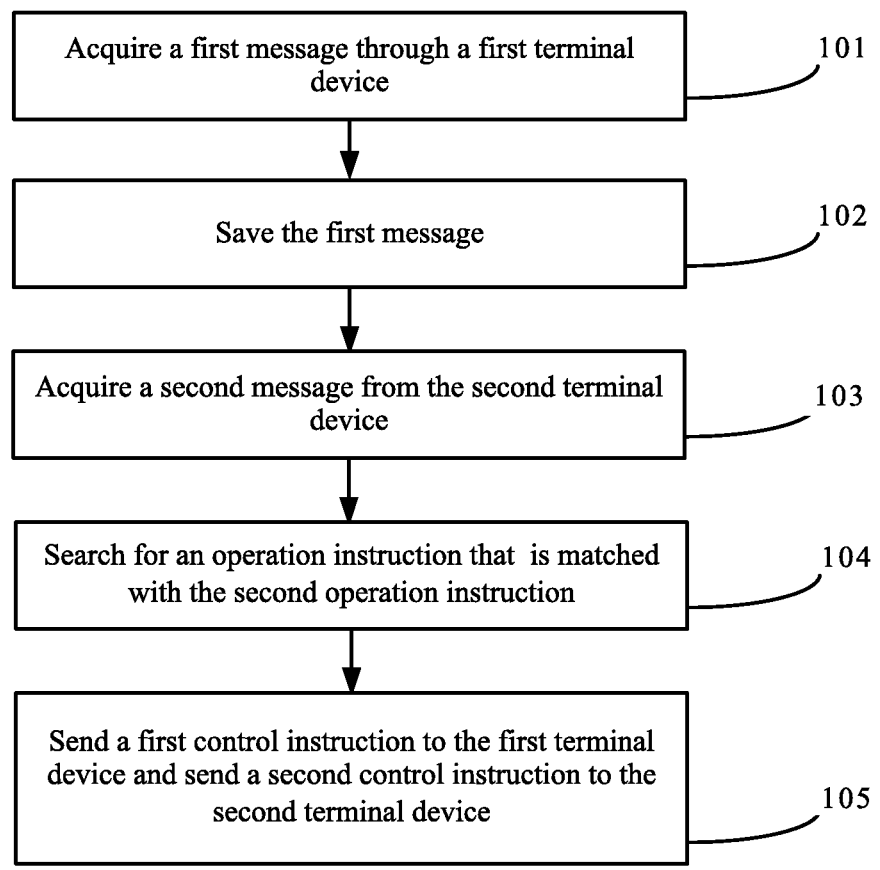
FIG. 1 is a schematic flowchart of a multi-screen interaction method according to an embodiment of the present invention.

An embodiment of the present invention provides a multi-screen interaction method. As shown in FIG. 1, the method includes the following steps.

101. Acquire a first message from a first terminal device.

The first message includes a first operation instruction and first state information. The first operation instruction is used to instruct to hand over a first operation currently executed by the first terminal device to a second terminal device for execution. The first state information is related information of the first operation currently executed by the first terminal device.

It should be noted that, the first terminal device is capable of joining a home network. Specifically, the first terminal device may be a smart phone, or a tablet computer, or a smart television, which is not limited by the present invention.

It should be noted that, the home network is a network formed by the first terminal device, a central device, a second terminal device, and other terminal devices. In the home network, a connection between terminal devices and between the central device and a terminal device may be a wireless network connection, for example, a Wireless Fidelity (Wi-Fi) network connection, and may also be a connection using a radio technology, for example, a Bluetooth technology. Further, a technology that can support data transmission between terminal devices and between the central device and a terminal device may be used, which is not limited by the present invention.

It should be noted that, the first operation may be an operation of playing a video on the first terminal device, or an operation of playing music, or an operation of browsing a document, or an operation of controlling a game, which is not limited by the present invention.

It should be noted that, the first state information may be a file size, a file format, a storage path, or other information related to the first operation.

For example, when the first operation is an operation of playing a video, the first state information may include a format, a storage path, video quality, and a video size of the video currently played.

Further, the first message further includes first user identity information.

It should be noted that, the first user identity information is information uniquely identifying a first user.

Further, a format of the first message may be XML (eXtensible Markup Language, extensible markup language).

It should be noted that, the format of the first message may also be another format, for example, a text or JSON (JavaScript Object Notation, a lightweight data exchange format) format, which is not limited by the present invention.

102. Save the first message.

Specifically, after acquiring the first message, the central device may parse the message to obtain the first operation instruction. The first operation instruction is used to instruct to hand over the first operation which is being executed by the first terminal device to the second terminal device for execution. When the central device cannot acquire, through the first terminal device, related information that is matched with the first operation instruction and that is used for determining the second terminal device, the central device needs to save the acquired first message, so as to determine the second terminal device, and send the related information of the first operation to the second terminal device.

103. Acquire a second message from the second terminal device.

The second message includes a second operation instruction. The second operation instruction is used to instruct to execute, by the second terminal device, the first operation.

It should be noted that, the second terminal device is capable of joining the home network. Specifically, the second terminal device may be a smart phone, or a tablet computer, or a smart television, which is not limited by the present invention.

Further, the second message further includes second user identity information.

The second user identity information is information uniquely identifying a second user.

It should be noted that, the second user and the first user may be a same user. In this case, the first user identity information and the second user identity information are the same. The second user and the first user may be not the same user. In this case, the first user identity information and the second user identity information are different. By using the second user identity information and the first user identity information, the central device may determine whether the two users are the same user.

Specifically, a format of the second message may be XML.

It should be noted that, the format of the second message may also be another format, for example, a text or JSON format, which is not limited by the present invention.

It should be noted that, the second operation instruction included in the second message is used to instruct that the first operation is executed by the second terminal device, which indicates that the first operation executed by a first terminal device could be handed over, through the central device, to the second terminal device for execution. In this case, after receiving the second message, the central device may search, according to the second message, for stored information that is matched with the second message. If such information is stored, it indicates that the central device may hand over the first operation from the first terminal device to the second terminal device for execution. In this case, the central device hands over the first operation to the second terminal device for execution. If such information is not stored, it indicates that the central device cannot hand over the first operation from the first terminal device to the second terminal device for execution. In this case, the central device may return a handover failure message to the second terminal device, or the central device does not perform any processing. Therefore, the central device may not store the second message. The first terminal device is illustrated as another terminal device of the second terminal device.

104. Search, according to the second operation instruction, for an operation instruction that is matched with the second operation instruction, among stored operation instructions.

Specifically, after receiving the second message sent by the second terminal device, the central device compares the second operation instruction in the second message with each piece of all stored operation instructions to determine whether an operation instruction that is matched with the second operation instruction exists.

It should be noted that, the central device presets matching relationships between various operation instructions. Further, the central device presets a matching relationship between the first operation instruction and the second operation instruction. In this case, the central device searches, according to the second operation instruction, for the first operation instruction among the stored operation instructions.

Further, in a case in which the first message further includes the first user identity information and the second message further includes the second user identity information, the central device may further search, according to the second user identity information, for user identity information which is matched with the second user identity information among stored user identity information.

In a case in which the first message further includes the first user identity information and the second message further includes the second user identity information, to perform matching between the operation instructions more accurately, the central device may further match identities of users that send the operation instructions. This can avoid performing matching between operation instructions sent by different users, and improve accuracy of matching of the operation instructions.

Specifically, after receiving the second message sent by the second terminal device, the central device compares the second user identity information in the second message with each piece of all stored user identity information to determine whether user identity information that is matched with the second user identity information exists, that is, to determine whether user identity information same as the second user identity information exists in the stored user identity information.

It should be noted that, in a case in which the first message includes the first user identity information and the first operation instruction and the second message includes the second user identity information and the second operation instruction, the central device may first match the user identity information and then match the operation instructions, or may first match the operation instructions and then match the user identity information, or may match the user identity information and the operation instructions simultaneously, which is not limited by the present invention.

105. Send a first control instruction to the first terminal device and send a second control instruction to the second terminal device, if it is found that the second operation instruction is matched with the first operation instruction.

The first control instruction is used to instruct the first terminal device to send the related information of the first operation to the second terminal device. The second control instruction is used to instruct the second terminal device to receive the related information of the first operation sent by the first terminal device.

Specifically, if the central device finds, among the stored operation instructions, that the first operation instruction is matched with the second operation instruction, the central device sends the first control instruction to the first terminal device to instruct the first terminal device to send the related information of the first operation to the second terminal device, and sends the second control instruction to the second terminal device to instruct the second terminal device to receive the related information of the first operation sent by the first terminal device.

Further, the central device finds that at least two first operation instructions are matched with the second operation instruction. In this case, the central device may select one first terminal device corresponding to either one of the first operation instructions, and send a first control message. The central device may also feed back information about the first terminal devices corresponding to the found at least two first operation instructions, and the second terminal device determines, from the first terminal devices corresponding to the at least two first operation instructions, a first terminal device to which the central device needs to send the first control message.

It should be noted that, at this time, a connection has been established between the terminal devices. After the central device finds the first operation instruction that is matched with the second operation instruction, the central device sends the first control instruction to the first terminal device, instructing the first terminal device to transmit content to be transmitted over the established connection between the first terminal device and the second terminal device, and the central device sends the second control instruction to the second terminal device, instructing the second terminal device to get ready for receiving, over the established connection between the first terminal device and the second terminal device, the content sent by the first terminal device, and finally, hands over the first operation currently executed on the first terminal device to the second terminal device for execution.

Further, when the first message further includes the first user identity information and the second message further includes the second user identity information, the central device searches, according to the second user identity information, for user identity information that is matched with the second user identity information from stored user identity information, if the central device finds that the second operation instruction is matched with the first operation instruction and finds that the second user identity information is matched with the first user identity information, the central device sends the first control instruction to the first terminal device and sends the second control instruction to the second terminal device.

That is, when identity authentication is required, not only matching on operation instructions needs to be performed, but also matching on identity information needs to be performed. When both matching on the operation instructions and matching on the identity information succeed, the matching is considered as successful and further the first operation currently executed on the first terminal device can be handed over to the second terminal device.

It should be noted that, if the first user identity information included in the first message is matched with the second user identity information included in the second message, the first user identity information included in the first message and the second user identity information included in the second message are the same.

It should be noted that, if no operation instruction that is matched with the second operation instruction is found among the stored operation instructions, the second operation instruction is invalid. In this case, the second operation instruction may be deleted directly, or a prompt message is sent to the second terminal device, prompting that the central device does not store an operation instruction that is matched with the second operation instruction, and that the handover cannot be performed. Similarly, in a case in which identity authentication is required, if either the operation instruction or the identity information is not matched successfully or neither of the operation instruction and the identity information is matched successfully, the operation instruction may be deleted directly, or a prompt message is sent to the second terminal device, prompting that the matching performed by the central device fails, and that the handover cannot be performed.

It should be noted that, if the central device finds that at least two first operation instructions and at least two pieces of first user identity information are respectively matched with the second operation instruction and the second user identity information, for the processing method of the central device, reference may be made to the processing method in which the central device finds that at least two first operation instructions are matched with the second operation instruction. Details are not repeated herein.

The embodiment of the present invention provides a multi-screen interaction method. A central device receives a message sent by a first terminal device and a message sent by a second terminal device, then matches operation instructions included in the messages, and after the matching succeeds, sends a first control instruction to the first terminal device and sends a second control instruction to the second terminal device, so that an operation on the first terminal device is handed over to the second terminal device. In this way, in a multi-screen interaction process, a process of matching by a user can be changed to a process of matching by a central device, thereby simplifying operation steps of the user and improving user experience.

Figure 2:
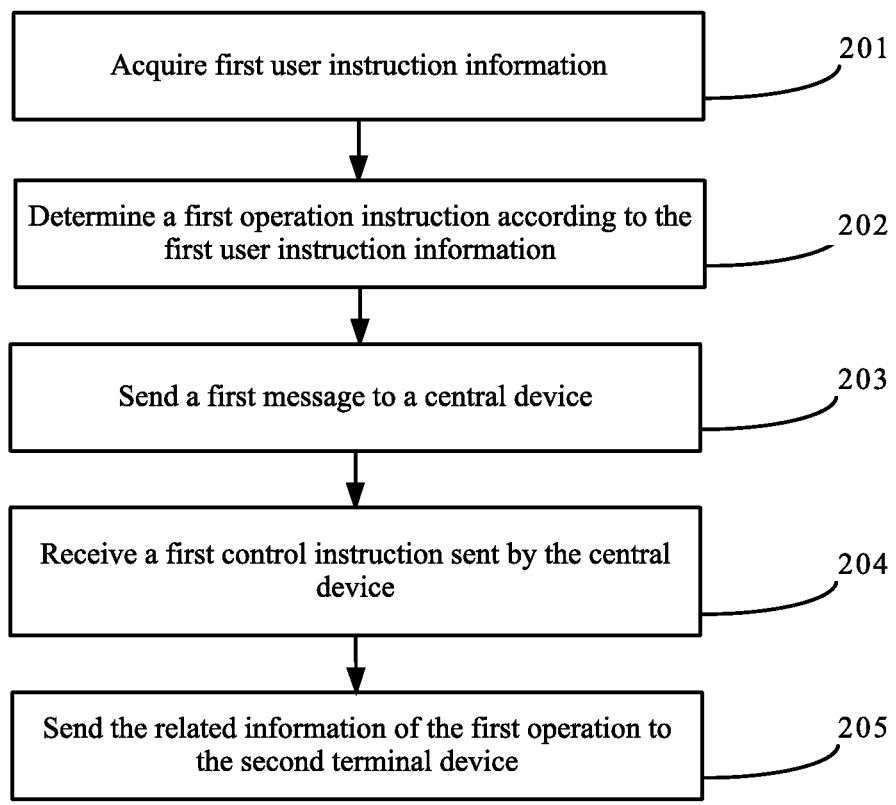
FIG. 2 is a schematic flowchart of another multi-screen interaction method according to an embodiment of the present invention.

An embodiment of the present invention provides a multi-screen interaction method. As shown in FIG. 2, the method may be performed by a first terminal device, and the method includes the following steps.

201. Acquire first user instruction information.

It should be noted that, the first user instruction information is made by a first user, and the information may include audio information of the first user or information of an action of operating the terminal device by the first user. The first terminal device is capable of acquiring the foregoing information sent by the user.

Specifically, the first terminal device may use an action performed by the first user or a sound made by the first user as the first user instruction information.

Further, the first terminal device may also acquire fingerprint information of the first user or other information that can uniquely identify the first user. In this case, the first user instruction information may further include information that can identify the first user, such as the fingerprint information of the first user.

It should be noted that, the information that is included in the first user instruction information and can identify the first user is acquired from the user by the terminal device. For example, the information is a voiceprint of the first user, a fingerprint of the first user, face information of the first user, or a password of the first user.

When the first terminal device acquires the action performed by the first user or information of the sound made by the first user, the first terminal device acquires related information that can be used to identify an identity of the first user. For example, the first terminal device acquires voiceprint information of the first user while acquiring the audio information.

202. Determine a first operation instruction according to the first user instruction information.

The first operation instruction is used to instruct to hand over a first operation currently executed by the first terminal device to another terminal device, such as a second terminal device, for execution.

It should be noted that, the first terminal device pre-stores correspondences between user instruction information and operation instructions.

Specifically, after acquiring the first user instruction information, the first terminal device may search the pre-stored correspondences between user instruction information and operation instructions, and when finding a piece of user instruction information that is matched with the first user instruction information, may know the operation instruction corresponding to the first user instruction information, that is, the first operation instruction.

It should be noted that, when the pre-stored correspondences between user instruction information and operation instructions are searched according to the first user instruction information, if no user instruction information that is matched with the first user instruction information is found in the pre-stored correspondences between user instruction information and operation instructions, it indicates that the first user instruction information is invalid, and the first terminal device may delete the first user instruction information directly.

203. Send a first message to a central device.

The first message includes the first operation instruction and first state information. The first state information is related information of the first operation currently executed by the first terminal device.

It should be noted that, the first operation may be an operation of playing a video on the first terminal device, or an operation of playing music, or an operation of browsing a document, or an operation of controlling a game, which is not limited by the present invention.

It should be noted that, the first state information may be a file size, a file format, a storage path, or other information related to the first operation.

For example, when the first operation is an operation of playing a video, the first state information includes a format, a storage path, video quality, and a video size of the current video.

Further, the first message further includes first user identity information.

It should be noted that, the first user identity information is information preset by the first terminal device, for uniquely identifying the first user.

It should be noted that, the first user identity information is set by the first terminal device for the first user, and is matched with information that can uniquely identify the first user and that is in the first user instruction information. That is, in the first terminal device, a correspondence between the first user identity information and the information that can uniquely identify the first user and that is in the first user instruction information is pre-stored. For example, the information that can uniquely identify the first user and that is in the first user instruction information is the fingerprint information of the first user, or the voiceprint information of the first user, or face information of the first user, or password information set by the first user. Therefore, the first terminal device pre-stores a correspondence between the first user identity information and the fingerprint information of the first user, or the voiceprint information of the first user, or the face information of the first user, or the password information set by the first user.

Specifically, after acquiring the first operation instruction, the first terminal device may determine the first user identity information according to the information that can uniquely identify the first user and that is in the first user instruction information, and therefore, may send the first operation instruction, the first state information, and the first user identity information as the first message to the central device.

Further, the first terminal device may encapsulate the first message in an XML format, and send the first message in the XML format to the central device.

204. Receive a first control instruction sent by the central device.

The first control instruction is used to instruct the first terminal device to send the related information of the first operation to the second terminal device.

It should be noted that, this step occurs only after the central device finds the first operation instruction that is matched with the second operation instruction.

In this case, the first terminal device receives the first control instruction sent by the central device, instructing the first terminal device to transmit content to be transmitted over an established connection, so that the first operation currently executed on the first terminal device is handed over to the second terminal device.

It should be noted that, the terminal device in the embodiment of the present invention refers to the first terminal device.

205. Send the related information of the first operation to the second terminal device according to the first control instruction.

It should be noted that, at this time, because a connection has been established between the terminal devices, the first terminal device only needs to send the related information of the first operation to the second terminal device over the pre-established connection.

The embodiment of the present invention provides a multi-screen interaction method. A first terminal device acquires first user instruction information, determines a first operation instruction according to the first user instruction information, sends a first message to a central device, and after receiving a first control instruction sent by the central device, sends related information of the first operation to the second terminal device according to the first control instruction. In this way, a user does not need to perform complicated operations step by step on an operation interface of the first terminal device, and only needs to send first user instruction information to the first terminal device, and the first terminal device can automatically identify the operation instruction. Therefore, operation steps of the user are simplified and user experience is further improved.

Figure 3:
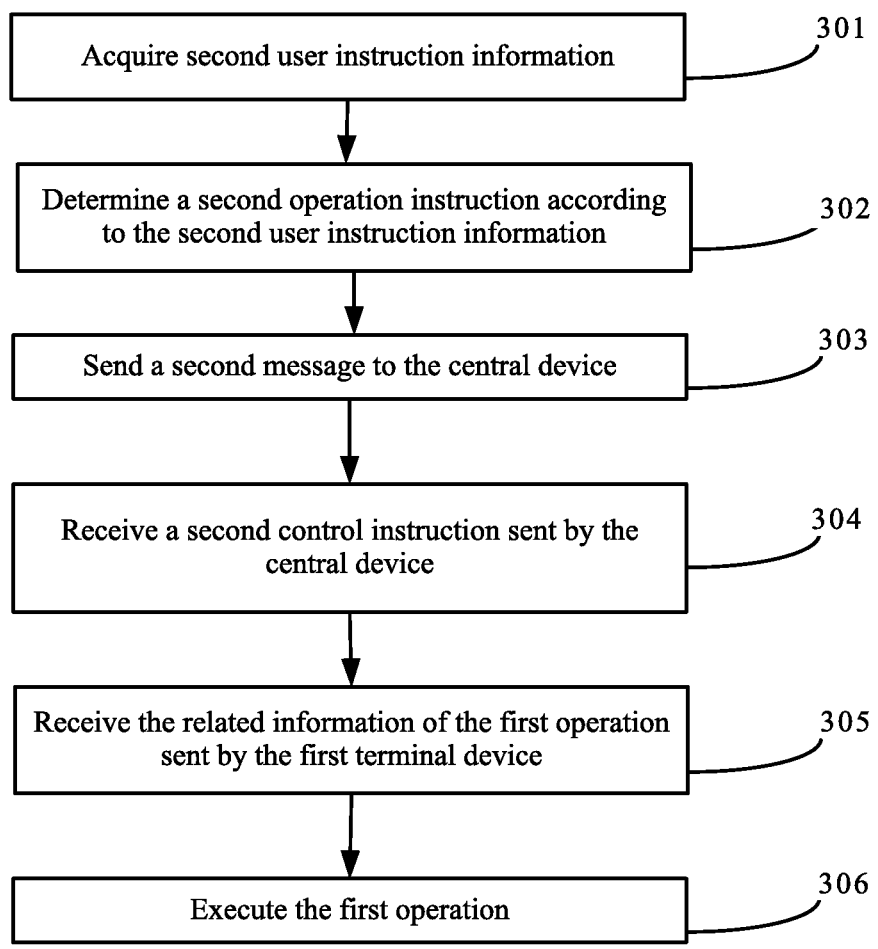
FIG. 3 is a schematic flowchart of another multi-screen interaction method according to an embodiment of the present invention.

An embodiment of the present invention provides a multi-screen interaction method. As shown in FIG. 3, the method may be performed by a second terminal device, and the method includes the following steps.

301. Acquire second user instruction information.

It should be noted that, the second user instruction information is made by a second user, and the information may include audio information of the second user or action information of the second user. The second terminal device is capable of acquiring the foregoing information sent by the user.

Specifically, the second terminal device may use an action performed by the second user or a sound made by the second user as the second user instruction information.

Further, the second terminal device may also acquire fingerprint information of the second user or other information that can uniquely identify the second user. In this case, the second user instruction information may further include information that can identify the second user, such as the fingerprint information of the second user.

It should be noted that, the information that is included in the second user instruction information and can identify the second user is acquired from the user by the second terminal device. For example, the information is a voiceprint of the second user, a fingerprint of the second user, face information of the second user, or a password of the second user.

When the second terminal device acquires the action performed by the second user or information of the sound made by the second user, the second terminal device acquires related information that can be used to identify an identity of the second user. For example, the second terminal device acquires voiceprint information of the second user while acquiring the audio information.

302. Determine a second operation instruction according to the second user instruction information.

The second operation instruction is used to instruct to execute, by the second terminal device, a first operation.

It should be noted that, the second operation instruction is an instruction used to instruct the second terminal device that a first operation of a first terminal device is handed over to the second terminal device.

It should be noted that, the second terminal device pre-stores correspondences between user instruction information and operation instructions.

Specifically, after acquiring the second user instruction information, the second terminal device may search the pre-stored correspondences between user instruction information and operation instructions, and when finding a piece of user instruction information that is matched with the second user instruction information, may know the operation instruction corresponding to the second user instruction information, that is, the second operation instruction.

It should be noted that, when the pre-stored correspondences between user instruction information and operation instructions are searched according to the second user instruction information, if no user instruction information that is matched with the second user instruction information is found in the pre-stored correspondences between user instruction information and operation instructions, it indicates that the second user instruction information is invalid, and the second terminal device may delete the second user instruction information directly.

303. Send a second message to a central device.

The second message includes the second operation instruction.

It should be noted that, the second operation instruction is an instruction instructing the second terminal device to execute the first operation. The second operation instruction may refer to an instruction for handing over an operation, such as an operation of playing a video on the first terminal device, or an operation of playing music, or an operation of browsing a document, or an operation of controlling a game, to the second terminal device for execution.

Further, the second message further includes second user identity information.

It should be noted that, the second user identity information is information preset by the second terminal device, for uniquely identifying the second user.

It should be noted that, the second user identity information is set by the second terminal device for the second user. The process of determining the second user identity information by the second terminal device is the same as the process of determining first user identity information by the first terminal device, and is not repeated herein.

Further, the second terminal device may encapsulate the second message in an XML format, and send the second message in the XML format to the central device.

304. Receive a second control instruction sent by the central device.

The second control instruction is used to instruct the second terminal device to receive related information of the first operation sent by a first terminal device.

It should be noted that, this step occurs only after the central device finds a first operation instruction that is matched with the second operation instruction.

In this case, the second terminal device receives the second control instruction sent by the central device, instructing the second terminal device receive to receive, over an established connection, the related information of the first operation sent by the first terminal device, so that the first operation currently executed on the first terminal device is handed over to the second terminal device for execution.

305. Receive, according to the second control instruction, the related information of the first operation sent by the first terminal device.

It should be noted that, at this time, because a connection has been established between the terminal devices, the second terminal device only needs to receive, over the pre-established connection, the related information of the first operation sent by the first terminal device.

306. Execute the first operation according to the received related information of the first operation.

Specifically, the second terminal device executes the first operation on the second terminal device after receiving the related information of the first operation sent by the first terminal device.

The embodiment of the present invention provides a multi-screen interaction method. A second terminal device acquires second user instruction information, determines a second operation instruction according to the second user instruction information, sends a second message to a central device, and after receiving a second control instruction sent by the central device, receives, according to the second control instruction, related information of a first operation sent by a first terminal device, and finally executes the first operation. In this way, a user only needs to send second user instruction information to the second terminal device, and the second terminal device can automatically identify the operation instruction. Therefore, operation steps of the user are simplified and user experience is further improved.

Figure 4A:
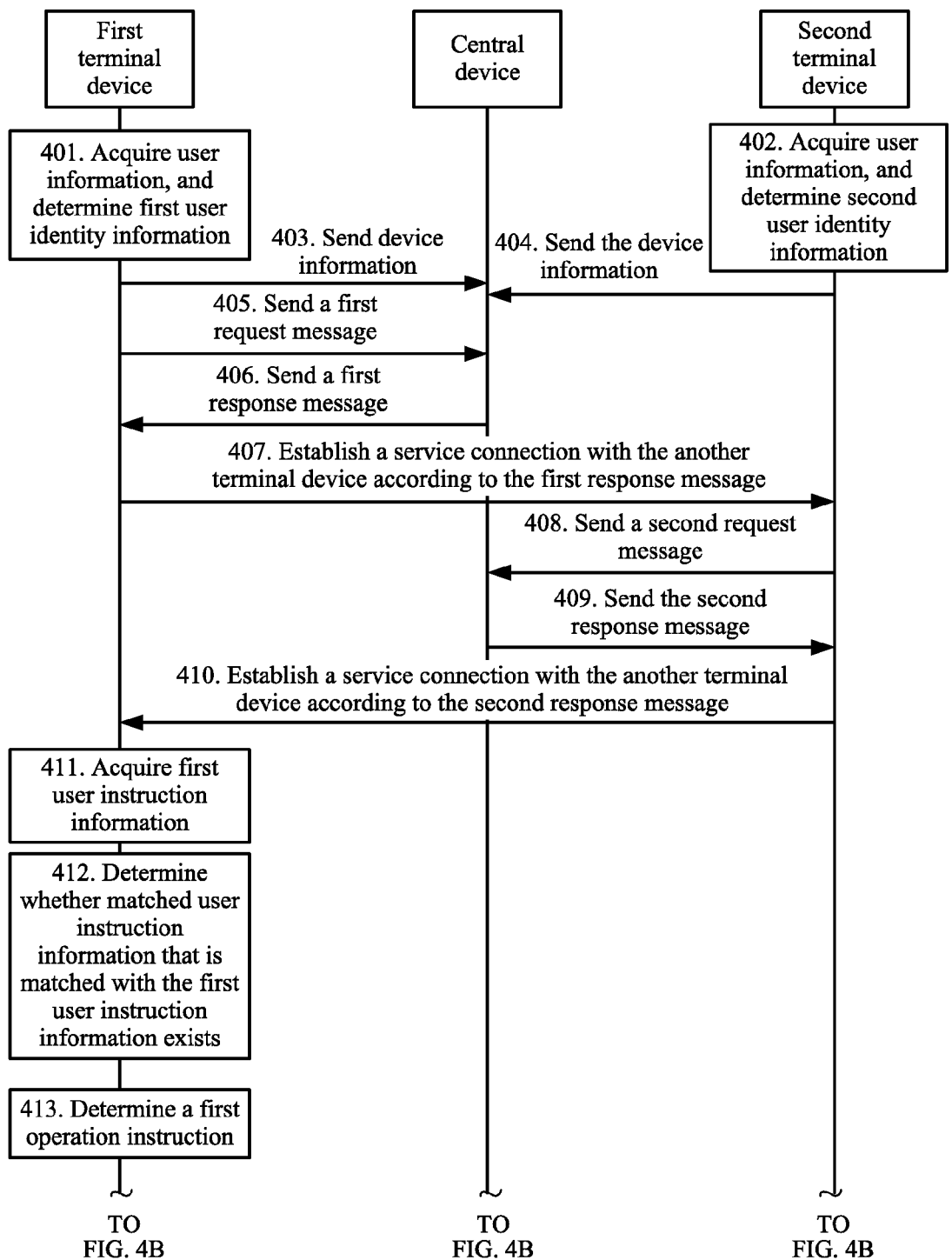
FIG. 4A and FIG. 4B are a schematic flowchart of another multi-screen interaction method according to an embodiment of the present invention.
Figure 4B:
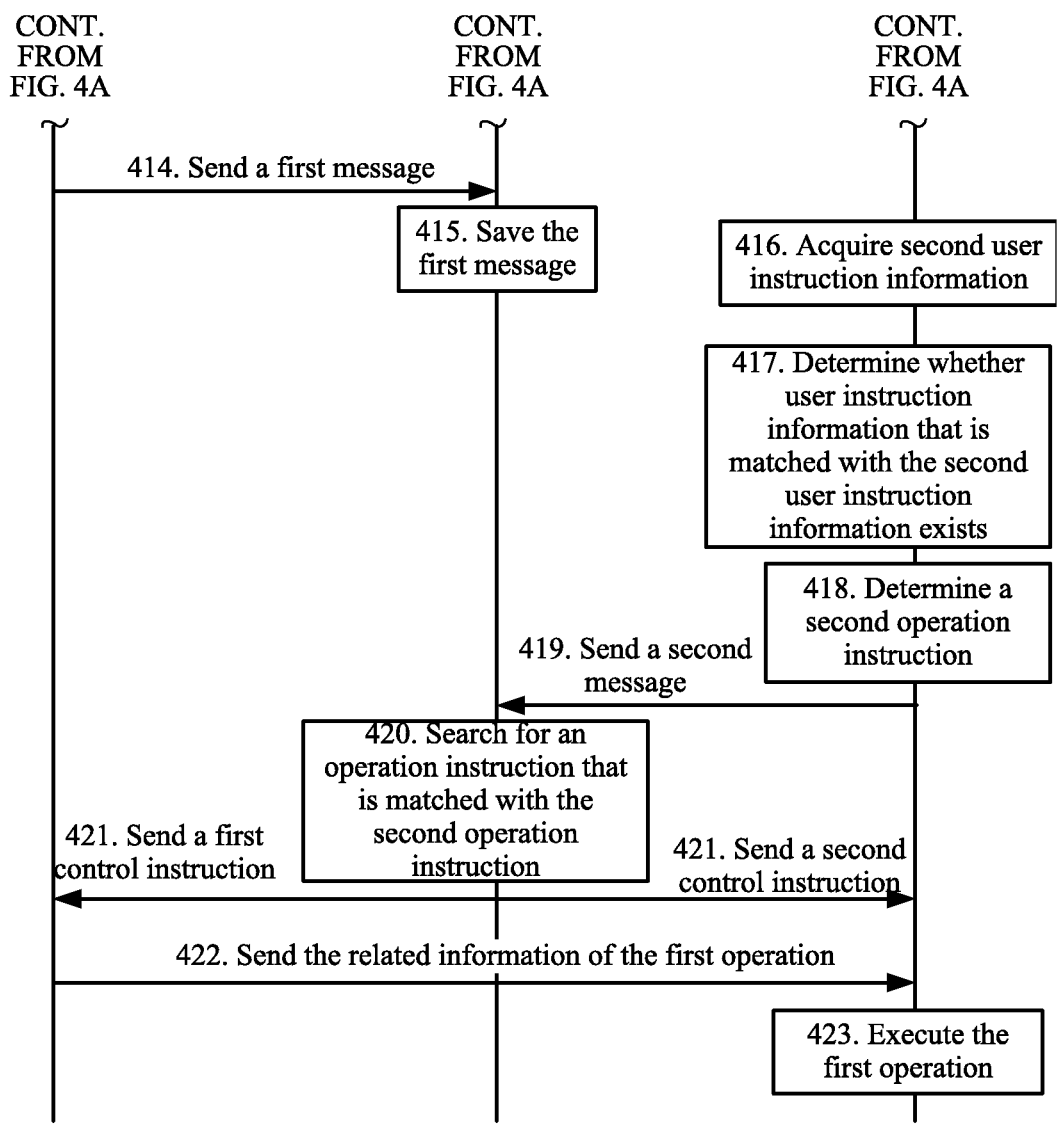

An embodiment of the present invention provides a multi-screen interaction method. As shown in FIG. 4A and FIG. 4B, the method includes the following steps.

401. A first terminal device acquires user information, and determines first user identity information according to the user information.

The user information is information input by a user for identifying the user.

It should be noted that, the user information is information that is input by the user and can uniquely identify an identity of the user, such as a fingerprint, a voiceprint, face information, or a password.

Specifically, after the first terminal device acquires various types of user information of the user that can identify the identity of the user, the first terminal device allocates first user identity information corresponding to the types of user information to the user, and stores the types of user information and the first user identity information and a correspondence thereof into the first terminal device.

402. A second terminal device acquires user information, and determines second user identity information according to the user information.

The user information is information input by a user for identifying the user.

For details, reference may be made to step 401. Details are not repeated herein.

It should be noted that, the embodiment of the present invention does not limit the execution sequence of step 401 and step 402. Step 401 may be executed first, and then step 402 may be executed. Alternatively, step 402 may be executed first, and then step 401 may be executed. Alternatively, step 401 and step 402 may be executed simultaneously. The embodiment of the present invention is described by using an example in which step 401 is first executed and then step 402 is executed.

403. The first terminal device sends device information to a central device, and the central device receives and registers the device information of the first terminal device.

The device information includes connection parameter information of the first terminal device.

It should be noted that, the device information of the first terminal device may not only include the connection parameter information, but also include information such as an device attribute of the first terminal device and a device capability of the first terminal device, which is not limited by the present invention.

Specifically, when the first terminal device starts a multi-screen interaction service, the first terminal device sends the device information to the central device, so as to notify the central device which service and what quality of the service can be provided by the first terminal device, and notify the central device of a connection parameter of the first terminal device. After receiving the device information of the first terminal device, the central device saves and writes the information, so as to establish a connection between the first terminal device and another device. The process of saving the device information of the first terminal device is a process of registering by the first terminal device with the central device.

404. The second terminal device sends device information to the central device, and the central device receives and registers the device information of the second terminal device.

The device information includes connection parameter information of the second terminal device.

For details, reference may be made to step 403. Details are not repeated herein.

It should be noted that, the embodiment of the present invention does not limit the execution sequence of step 403 and step 404. Step 403 may be executed first, and then step 404 may be executed. Alternatively, step 404 may be executed first, and then step 403 may be executed. Alternatively, step 403 and step 404 may be executed simultaneously. The embodiment of the present invention is described by using an example in which step 403 is first executed and then step 404 is executed.

405. The first terminal device sends a first request message to the central device, and the central device receives the first request message sent by the first terminal device.

The first request message is a message for representing that the first terminal device acquires connection parameter information of a second terminal device.

It should be noted that, because at this time, the first terminal device does not determine a terminal device to which the first terminal device transmits related information of a first operation, the first request message sent by the first terminal device to the central device is used to establish connections with all terminal devices except the first terminal device itself in a local network.

It should be noted that, not only the first terminal device sends the first request message to the central device, but also all the terminal devices in the local network send request messages to the central device. Therefore, in the network, there is not only a connection with a second terminal device, which is initiated by the first terminal device, but also a connection with the first terminal device, which is initiated by a second terminal device, that is, the first terminal device has two connection channels with any other terminal device in the network.

406. The central device sends a first response message to the first terminal device, and the first terminal device receives the first response message sent by the central device.

The connection parameter information of the second terminal device is carried in the first response message.

Specifically, after receiving the first request message sent by the first terminal device, the central device needs to send registered connection parameter information of the another device in the local network to the first terminal device, so that the first terminal device establishes a connection, which is initiated by the first terminal device, with the second terminal device in the local network.

407. The first terminal device establishes a service connection with the second terminal device according to the first response message.

Specifically, after receiving the first response message that is sent by the central device and in which the connection parameter information of the second terminal device is carried, the first terminal device establishes a connection with the second terminal device through the central device according to the first response message.

408. The second terminal device sends a second request message to the central device, and the central device receives the second request message sent by the second terminal device.

The second request message is a message for representing that the second terminal device acquires connection parameter information of a first terminal device.

It should be noted that, because at this time, the second terminal device does not determine a terminal device from which the second terminal device receives the related information of the first operation, the second request message sent by the second terminal device to the central device is used to establish connections with all terminal devices except the second terminal device itself in the local network.

It should be noted that, not only the second terminal device sends the second request message to the central device, but also all the terminal devices in the local network send request messages to the central device. Therefore, in the network, there is not only a connection with a first terminal device, which is initiated by the second terminal device, but also a connection with the second terminal device, which is initiated by a first terminal device, that is, the second terminal device has two connection channels with any other terminal device in the network.

409. The central device sends a second response message to the second terminal device, and the second terminal device receives the second response message sent by the central device.

The connection parameter information of the first terminal device is carried in the second response message.

For details, reference may be made to step 406. Details are not repeated herein.

410. The second terminal device establishes a service connection with the first terminal device according to the second response message.

For details, reference may be made to step 407. Details are not repeated herein.

It should be noted that, the embodiment of the present invention does not limit the execution sequence of steps 405 to 407 and steps 408 to 410. Steps 405 to 407 may be executed first, and then steps 408 to 410 may be executed. Alternatively, steps 408 to 410 may be executed first, and then steps 405 to 407 may be executed. Alternatively, steps 405 to 407 and steps 408 to 410 may be executed simultaneously. The embodiment of the present invention is described by using an example in which steps 405 to 407 are first executed and then steps 408 to 410 are executed.

411. The first terminal device acquires first user instruction information.

For details, reference may be made to step 201. Details are not repeated herein.

412. The first terminal device determines, according to the first user instruction information, whether user instruction information that is matched with the first user instruction information exists in stored user instruction information.

It should be noted that, the first terminal device presets valid user instruction information, and stores the valid user instruction information.

Specifically, after acquiring the first user instruction information, the first terminal device needs to determine whether the first user instruction information is valid instruction information. The first terminal device searches the stored user instruction information according to the first user instruction information, and determines whether user instruction information that is matched with the first user instruction information exists in the stored user instruction information within an error range.

If matched user instruction information exists, it indicates that the first user instruction information is valid instruction information; if no matched user instruction information exists, it indicates that the first user instruction information is invalid instruction information, and in this case, the first terminal device does not process the first user instruction information any longer.

For example, the first terminal device extracts feature information of acquired audio information, and matches the feature information with pre-stored user instruction information. If user instruction information that is matched with the feature information exists within an error range, it is considered that the audio information is operation-related information sent by the user.

413. If it is determined that matched user instruction information exists, the first terminal device determines a first operation instruction according to the matched instruction information.

The first operation instruction is used to instruct to hand over the first operation currently executed by the first terminal device to a second terminal device for execution.

Specifically, after determining the user instruction information that is matched with the first user instruction information, the first terminal device may determine the first operation instruction according to the matched user instruction information. In this case, the first terminal device stores correspondences between valid user instruction information and operation instructions. The first terminal device may convert the user instruction information that is matched with the first user instruction information into the first operation instruction according to the correspondences. Reference may be made to step 202.

414. The first terminal device sends a first message to the central device, and the central device acquires the first message from the first terminal device.

The first message includes the first operation instruction and first state information, where the first state information is the related information of the first operation currently executed by the first terminal device.

For details, reference may be made to step 101 and step 203. Details are not repeated herein.

415. The central device saves the first message.

For details, reference may be made to step 102. Details are not repeated herein.

416. The second terminal device acquires second user instruction information.

For details, reference may be made to step 301. Details are not repeated herein.

417. The second terminal device determines, according to the second user instruction information, whether user instruction information that is matched with the second user instruction information exists in stored user instruction information.

Specifically, the process of determining, by the second terminal device according to the second user instruction information, whether user instruction information that is matched with the second user instruction information exists in stored user instruction information is the same as the process of determining, by the first terminal device according to the first user instruction information, whether user instruction information that is matched with the first user instruction information exists in stored user instruction information. Reference may be made to step 412. Details are not repeated herein.

418. If the second terminal device determines that a matched user instruction exists, the second terminal device determines a second operation instruction according to the matched instruction.

The second operation instruction is used to instruct to execute, by the second terminal device, the first operation.

Specifically, the process of determining a second operation instruction according to the matched instruction if the second terminal device determines that a matched user instruction exists is the same as the process of determining a first operation instruction according to the matched instruction if the first terminal device determines that a matched user instruction exists. Reference may be made to step 413. Details are not repeated herein.

419. The second terminal device sends a second message to the central device, and the central device acquires the second message from the second terminal device.

The second message includes a second operation instruction. The second operation instruction is used to instruct to execute, by the second terminal device, the first operation.

For details, reference may be made to step 302 and step 103. Details are not repeated herein.

420. The central device searches, according to the second operation instruction, for an operation instruction that is matched with the second operation instruction, among stored operation instructions.

For details, reference may be made to step 104. Details are not repeated herein.

421. The central device sends a first control instruction to the first terminal device and sends a second control instruction to the second terminal device if the central device finds that the second operation instruction is matched with the first operation instruction; and the first terminal device receives the first control instruction sent by the central device, and the second terminal device receives the second control instruction sent by the central device.

For details, reference may be made to steps 105, 204, and 304. Details are not repeated herein.

422. The first terminal device sends the related information of the first operation to the second terminal device according to the first control instruction; and the second terminal device receives, according to the second control instruction, the related information of the first operation sent by the first terminal device.

For details, reference may be made to step 205 and step 305. Details are not repeated herein.

423. The second terminal device executes the first operation according to the received related information of the first operation.

For details, reference may be made to step 306. Details are not repeated herein.

The embodiment of the present invention provides a multi-screen interaction method. A central device establishes connections between terminal devices after storing user information and device parameter information. A first terminal device acquires a first message according to first user instruction information, and sends the first message to the central device; a second terminal device acquires a second message according to second user instruction information, and sends the second message to the central device; the central device receives the messages sent by the first terminal device and second terminal device, and then matches operation instructions included in the messages; and after the matching succeeds, the central device sends a first control instruction to the first terminal device, and sends a second control instruction to the second terminal device, so as to hand over a first operation on the first terminal device to the second terminal device for execution. In this way, in an interaction process, a user only needs to send first user instruction information on the first terminal device, and send second user instruction information on the second terminal device. After the first terminal device sends a first message to the central device, and the second terminal device sends a second message on the central device, the central device performs a process of matching an operation instruction of the user and identifying an identity of the user, without participation of the user. After the central device completes the matching, the central device triggers completion of a handover process of the first operation between the first terminal device and the second terminal device, without participation of the user, thereby simplifying operation steps of the user and improving user experience.

Figure 5:
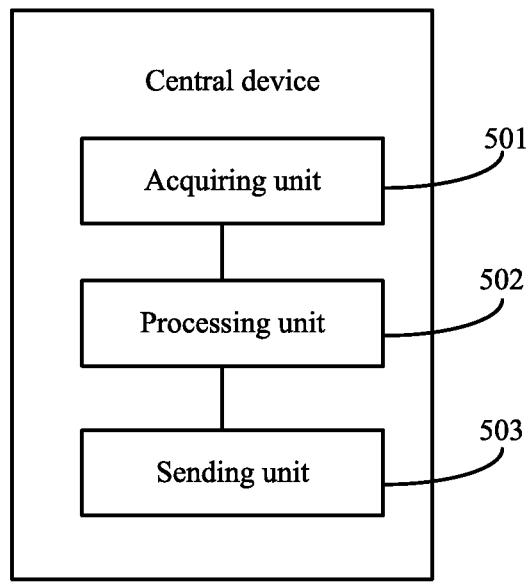
FIG. 5 is a schematic functional diagram of a central device according to an embodiment of the present invention.

FIG. 5 is a schematic functional diagram of a central device according to an embodiment of the present invention. As shown in FIG. 5, the central device includes: an acquiring unit 501, a processing unit 502, and a sending unit 503.

The acquiring unit 501 is configured to acquire a first message from a first terminal device.

The first message includes a first operation instruction and first state information. The first operation instruction is used to instruct to hand over a first operation currently executed by the first terminal device to a second terminal device for execution. The first state information is related information of the first operation currently executed by the first terminal device.

It should be noted that, the first terminal device is capable of joining a home network. Specifically, the first terminal device may be a smart phone, or a tablet computer, or a smart television, which is not limited by the present invention.

It should be noted that, the home network is a network formed by the first terminal device, the central device, a second terminal device, and other terminal devices. In the home network, a connection between terminal devices and between the central device and a terminal device may be a wireless network connection, for example, a Wireless Fidelity (Wi-Fi) network connection, and may also be a connection using a radio technology, for example, a Bluetooth technology. Further, a technology that can support data transmission between terminal devices and between the central device and a terminal device may be used, which is not limited by the present invention.

It should be noted that, the first operation may be an operation of playing a video on the first terminal device, or an operation of playing music, or an operation of browsing a document, or an operation of controlling a game, which is not limited by the present invention.

It should be noted that, the first state information may be a file size, a file format, a storage path, or other information related to the first operation.

For example, when the first operation is an operation of playing a video, the first state information may include a format, a storage path, video quality, and a video size of the video currently played.

Further, the first message further includes first user identity information.

It should be noted that, the first user identity information is information uniquely identifying a first user.

Further, a format of the first message may be XML (eXtensible Markup Language, extensible markup language).

It should be noted that, the format of the first message may also be another format, for example, a text identity or JSON (JavaScript Object Notation, a lightweight data exchange format), which is not limited by the present invention.

The processing unit 502 is configured to save the first message acquired by the acquiring unit 501.

Specifically, after acquiring the first message, the acquiring unit 501 may parse the message to obtain the first operation instruction. The first operation instruction is used to instruct to hand over the first operation which is being executed by the first terminal device to the second terminal device for execution. When the acquiring unit 501 cannot acquire, through the first terminal device, related information that is matched with the first operation instruction and that is used for determining the second terminal device, the processing unit 502 needs to save the first message acquired by the acquiring unit 501, for determining the second terminal device, and send the related information of the first operation to the second terminal device.

The acquiring unit 501 is further configured to acquire a second message from the second terminal device.

The second message includes a second operation instruction. The second operation instruction is used to instruct to execute, by the second terminal device, the first operation.

It should be noted that, the second terminal device is capable of joining the home network. Specifically, the second terminal device may be a smart phone, or a tablet computer, or a smart television, which is not limited by the present invention.

Further, the second message further includes second user identity information.

The second user identity information is information uniquely identifying a second user.

It should be noted that, the second user and the first user may be a same user. In this case, the first user identity information and the second user identity information are the same. The second user and the first user may be not the same user. In this case, the first user identity information and the second user identity information are different. By using the second user identity information and the first user identity information, the central device may determine whether the two users are the same user.

Specifically, a format of the second message may be XML (eXtensible Markup Language, extensible markup language).

It should be noted that, the format of the second message may also be another format, for example, a text identity or JSON (JavaScript Object Notation, a lightweight data exchange format), which is not limited by the present invention.

It should be noted that, the second operation instruction included in the second message is used to instruct that the first operation is executed by the second terminal device, which indicates that the first operation executed by a first terminal device could be handed over, through the central device, to the second terminal device for execution. In this case, after receiving the second message, the central device may search, according to the second message, for stored information that is matched with the second message. If such information is stored, it indicates that the central device may hand over the first operation from the first terminal device to the second terminal device for execution. In this case, the central device hands over the first operation to the second terminal device for execution. If such information is not stored, it indicates that the central device cannot hand over the first operation from the first terminal device to the second terminal device for execution. In this case, the central device may return a handover failure message to the second terminal device, or the central device does not perform any processing. Therefore, the central device may not store the second message. The first terminal device is illustrated as another terminal device of the second terminal device.

The processing unit 502 is further configured to search, according to the second operation instruction, for an operation instruction that is matched with the second operation instruction, among stored operation instructions.

Specifically, after receiving the second message sent by the second terminal device, the acquiring unit 501 compares the second operation instruction in the second message with each piece of all stored operation instructions to determine whether an operation instruction that is matched with the second operation instruction exists.

It should be noted that, the central device presets matching relationships between various operation instructions. Further, the central device presets a matching relationship between the first operation instruction and the second operation instruction. In this case, the processing unit 502 searches, according to the second operation instruction, for the first operation instruction among the stored operation instructions.

Further, in a case in which the first message further includes the first user identity information and the second message further includes the second user identity information, the processing unit 502 may further search, according to the second user identity information, for user identity information which is matched with the second user identity information among stored user identity information.

In a case in which the first message further includes the first user identity information and the second message further includes the second user identity information, to perform matching between the operation instructions more accurately, the processing unit 502 may further match identities of users that send the operation instructions. This can avoid performing matching between operation instructions sent by different users, and improve accuracy of matching of the operation instructions.

Specifically, after receiving the second message sent by the second terminal device, the acquiring unit 501 compares the second user identity information in the second message with each piece of all stored user identity information to determine whether user identity information that is matched with the second user identity information exists, that is, to determine whether user identity information same as the second user identity information exists in the stored user identity information.

It should be noted that, in a case in which the first message includes the first user identity information and the first operation instruction and the second message includes the second user identity information and the second operation instruction, the processing unit 502 may first match the user identity information and then match the operation instructions, or may first match the operation instructions and then match the user identity information, or may match the user identity information and the operation instructions simultaneously, which is not limited by the present invention.

The sending unit 503 is configured to send a first control instruction to the first terminal device and send a second control instruction to the second terminal device if the processing unit 502 finds that the second operation instruction is matched with the first operation instruction.

The first control instruction is used to instruct the first terminal device to send the related information of the first operation to the second terminal device. The second control instruction is used to instruct the second terminal device to receive the related information of the first operation sent by the first terminal device.

Specifically, if the processing unit 502 finds, among the stored operation instructions, that the first operation instruction is matched with the second operation instruction, the sending unit 503 sends the first control instruction to the first terminal device, where the first control instruction is used to instruct the first terminal device to send the related information of the first operation to the second terminal device, and sends the second control instruction to the second terminal device, where the second control instruction is used to instruct the second terminal device to receive the related information of the first operation sent by the first terminal device.

Further, the processing unit 502 finds that at least two first operation instructions are matched with the second operation instruction. In this case, the processing unit 502 may select one first terminal device corresponding to either one of the first operation instructions, and the sending unit 503 sends a first control message. The central device may also feed back information about the first terminal devices corresponding to the found at least two first operation instructions, and the second terminal device determines, from the first terminal devices corresponding to the at least two first operation instructions, a first terminal device to which the central device needs to send the first control message.

It should be noted that, at this time, a connection has been established between the terminal devices. After the processing unit 502 finds the first operation instruction that is matched with the second operation instruction, the sending unit 503 sends the first control instruction to the first terminal device, instructing the first terminal device to transmit content to be transmitted over the established connection between the first terminal device and the second terminal device, and the sending unit 503 sends the second control instruction to the second terminal device, instructing the second terminal device to get ready for receiving, over the established connection between the first terminal device and the second terminal device, the content sent by the first terminal device, and finally, the first operation currently executed on the first terminal device is handed over to the second terminal device for execution.

Further, when the first message further includes the first user identity information and the second message further includes the second user identity information, the processing unit 502 searches, according to the second user identity information, for user identity information that is matched with the second user identity information from stored user identity information, if the processing unit 502 finds that the second operation instruction is matched with the first operation instruction and finds that the second user identity information is matched with the first user identity information, the sending unit 503 sends the first control instruction to the first terminal device, and sends the second control instruction to the second terminal device.

That is, if identity authentication is required, not only matching on operation instructions need to be performed, but also matching on identity information needs to be performed. When both matching on the operation instructions and matching on the identity information succeed, the matching is considered as successful and further the first operation currently executed on the first terminal device can be handed over to the second terminal device.

It should be noted that, if the first user identity information included in the first message is matched with the second user identity information included in the second message, the first user identity information included in the first message and the second user identity information included in the second message are the same.

It should be noted that, if the processing unit 502 finds no operation instruction that is matched with the second operation instruction among the stored operation instructions, the operation instruction is invalid. In this case, the second operation instruction may be deleted directly, or the sending unit 503 sends a prompt message to the second terminal device, prompting that the central device does not store an operation instruction that is matched with the second operation instruction, and that the handover cannot be performed. Similarly, in a case in which identity authentication is required, if either the operation instruction or the identity information is not matched successfully or neither of the operation instruction and the identity information is matched successfully, the operation instruction may be deleted directly, or the sending unit 503 sends a prompt message to the second terminal device, prompting that the matching performed by the central device fails, and that the handover cannot be performed.

It should be noted that, if the processing unit 502 finds that at least two first operation instructions and at least two pieces of first user identity information are respectively matched with the second operation instruction and the second user identity information, for the processing method of the processing unit 502, reference may be made to the processing method in which the central device finds that at least two first operation instructions are matched with the second operation instruction. Details are not repeated herein.

Figure 6:
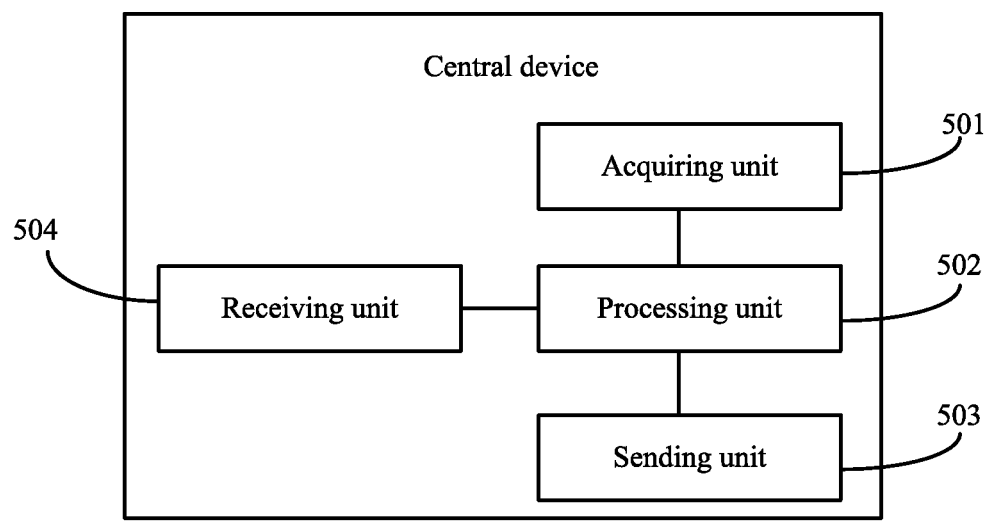
FIG. 6 is a schematic functional diagram of another central device according to an embodiment of the present invention.

Further, as shown in FIG. 6, the central device further includes: a receiving unit 504.

In this case, the receiving unit 504 is configured to receive device information of the first terminal device and device information of the second terminal device. The device information of the first terminal device includes connection parameter information of the first terminal device. The device information of the second terminal device includes connection parameter information of the second terminal device.

The processing unit 502 is further configured to register the device information of the first terminal device and the device information of the second terminal device.

The embodiment of the present invention provides a central device. An acquiring unit receives a message sent by a first terminal device and a message sent by a second terminal device; then a processing unit matches operation instructions included in the messages; and after the matching succeeds, a sending unit sends a first control instruction to the first terminal device and sends a second control instruction to the second terminal device, so that an operation on the first terminal device is handed over to the second terminal device. In this way, in a multi-screen interaction process, a process of matching by a user can be changed to a process of matching by a central device, thereby simplifying operation steps of the user and improving user experience.

Figure 7:
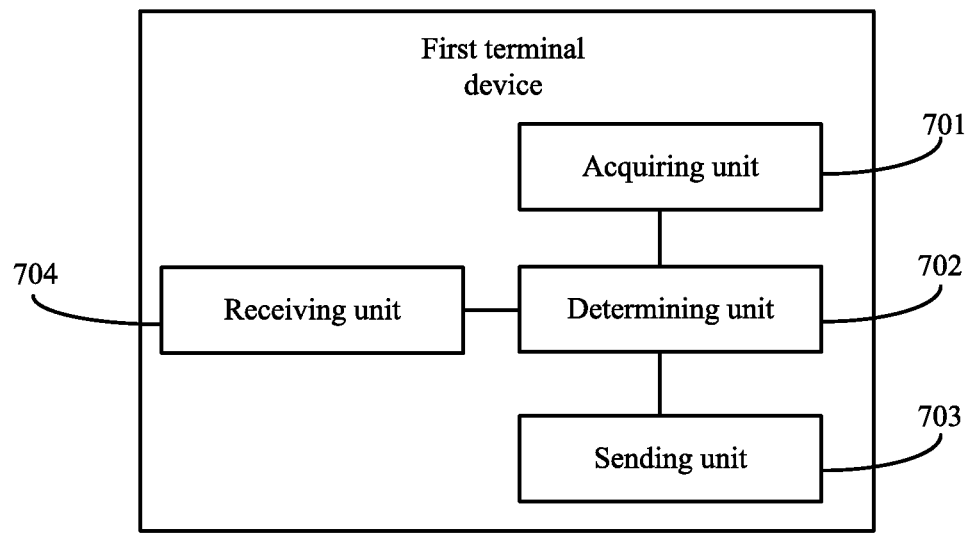
FIG. 7 is a schematic functional diagram of a first terminal device according to an embodiment of the present invention.

FIG. 7 is a schematic functional diagram of a terminal device according to an embodiment of the present invention. As shown in FIG. 7, the terminal device includes: an acquiring unit 701, a determining unit 702, a sending unit 703, and a receiving unit 704.

The acquiring unit 701 is configured to acquire first user instruction information.

It should be noted that, the first user instruction information is made by a first user, and the information may include audio information of the first user or information of an action of operating the terminal device by the first user. The terminal device is capable of acquiring the foregoing information sent by the user.

Specifically, the acquiring unit 701 may use an action performed by the first user or a sound made by the first user as the first user instruction information.

Further, the acquiring unit 701 may also acquire fingerprint information of the first user or other information that can uniquely identify the first user. In this case, the first user instruction information may further include information that can identify the first user, such as the fingerprint information of the first user.

It should be noted that, the information that is included in the first user instruction information and can identify the first user is acquired from the user by the terminal device. For example, the information is a voiceprint of the first user, a fingerprint of the first user, face information of the first user, or a password of the first user.

It should be noted that, the acquiring unit 701 acquires the action performed by the first user or information of the sound made by the first user, the acquiring unit 701 acquires related information that can be used to identify an identity of the first user. For example, the terminal device acquires voiceprint information of the first user while acquiring the audio information.

The determining unit 702 is configured to determine a first operation instruction according to the first user instruction information acquired by the acquiring unit 701.

The first operation instruction is used to instruct to hand over a first operation currently executed by the first terminal device to a second terminal device for execution.

It should be noted that, the terminal device pre-stores correspondences between user instruction information and operation instructions.

Specifically, after the acquiring unit 701 acquires the first user instruction information, the determining unit 702 may search the pre-stored correspondences between user instruction information and operation instructions, and when finding a piece of user instruction information that is matched with the first user instruction information, may know the operation instruction corresponding to the first user instruction information, that is, the first operation instruction.

It should be noted that, when the pre-stored correspondences between user instruction information and operation instructions are searched according to the first user instruction information, if no user instruction information that is matched with the first user instruction information is found in the pre-stored correspondences between user instruction information and operation instructions, it indicates that the first user instruction information is invalid, and the terminal device may delete the first user instruction information directly.

The sending unit 703 is configured to send a first message to a central device.

The first message includes the first operation instruction and first state information. The first state information is related information of the first operation currently executed by the first terminal device.

It should be noted that, the first operation may be an operation of playing a video on the first terminal device, or an operation of playing music, or an operation of browsing a document, or an operation of controlling a game, which is not limited by the present invention.

It should be noted that, the first state information may be a file size, a file format, a storage path, or other information related to the first operation.

For example, when the first operation is an operation of playing a video, the first state information includes a format, a storage path, video quality, and a video size of the current video.

Further, the first message further includes first user identity information.

It should be noted that, the first user identity information is information preset by the first terminal device, for uniquely identifying the first user.

It should be noted that, the first user identity information is set by the terminal device for the first user, and is matched with information that can uniquely identify the first user and that is in the first user instruction information. That is, in the terminal device, a correspondence between the first user identity information and the information that can uniquely identify the first user and that is in the first user instruction information is pre-stored. For example, the information that can uniquely identify the first user and that is in the first user instruction information is the fingerprint information of the first user, or the voiceprint information of the first user, or face information of the first user, or password information set by the first user. Therefore, the terminal device pre-stores a correspondence between the first user identity information and the fingerprint information of the first user, or the voiceprint information of the first user, or the face information of the first user, or the password information set by the first user.

Specifically, after the acquiring unit 701 acquires the first operation instruction, the determining unit 702 may determine the first user identity information according to the information that can uniquely identify the first user and that is in the first user instruction information, and therefore, may use the first operation instruction, the first state information, and the first user identity information as the first message that is sent by the sending unit 703 to the central device.

Further, the terminal device may encapsulate the first message in an XML format, and send the first message in the XML format to the central device.

The receiving unit 704 is configured to receive a first control instruction sent by the central device.

The first control instruction is used to instruct the first terminal device to send the related information of the first operation to the second terminal device.

It should be noted that, this step occurs only after the determining unit 702 finds the first operation instruction that is matched with the second operation instruction.

In this case, the receiving unit 704 receives the first control instruction sent by the central device, instructing the terminal device to transmit content to be transmitted over an established connection, so that the first operation currently executed on the terminal device is handed over to the second terminal device.

It should be noted that, the terminal device in the embodiment of the present invention refers to the first terminal device.

The sending unit 703 is further configured to send the related information of the first operation to the second terminal device according to the first control instruction.

It should be noted that, at this time, because a connection has been established between the terminal devices, the sending unit 703 only needs to send the related information of the first operation to the second terminal device over the pre-established connection.

Figure 8:
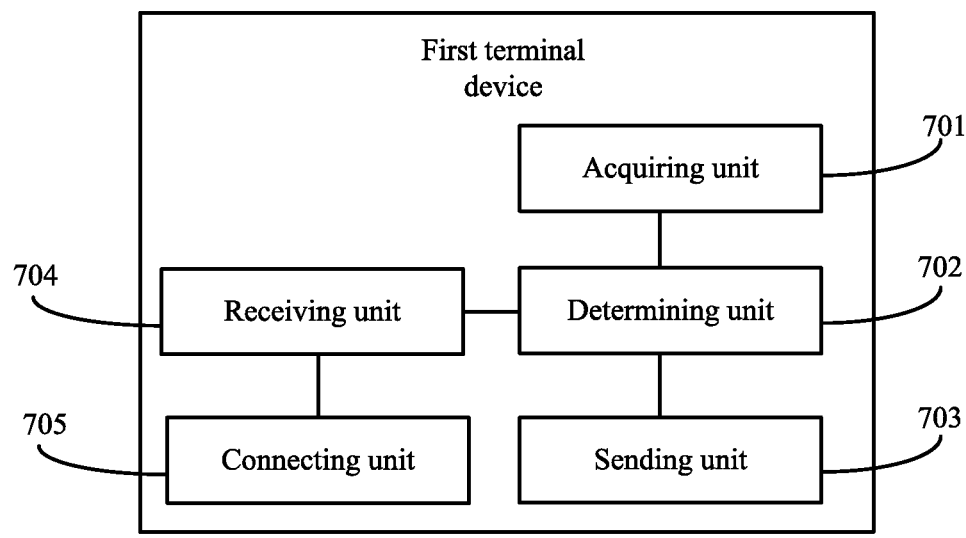
FIG. 8 is a schematic functional diagram of another first terminal device according to an embodiment of the present invention.

Further, as shown in FIG. 8, the terminal device further includes: a connecting unit 705.

In this case, the sending unit 703 is further configured to send a first request message to the central device. The first request message is a message for representing that the first terminal device acquires connection parameter information of a second terminal device.

The receiving unit 704 is further configured to receive a first response message sent by the central device. The connection parameter information of the second terminal device is carried in the first response message.

The connecting unit 705 is configured to establish a service connection with the second terminal device according to the first response message.

The embodiment of the present invention provides a terminal device. An acquiring unit acquires first user instruction information; a determining unit determines a first operation instruction according to the first user instruction information; a sending unit sends a first message to a central device; and after a receiving unit receives a first control instruction sent by the central device, the sending unit sends related information of a first operation to a second terminal device according to the first control instruction. In this way, a user does not need to perform complicated operations step by step on an operation interface of the terminal device, and only needs to send first user instruction information to the terminal device, and the terminal device can automatically identify the operation instruction. Therefore, operation steps of the user are simplified and user experience is further improved.

Figure 9:
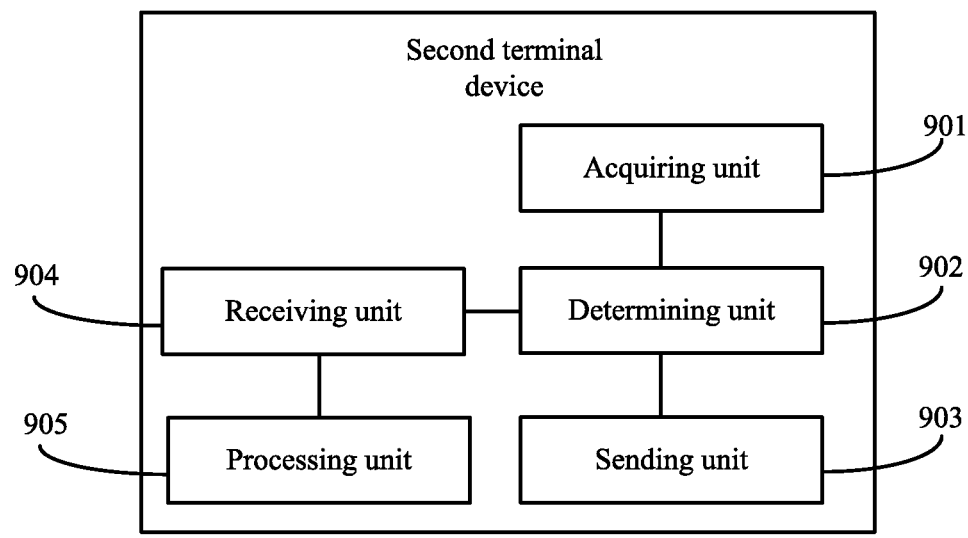
FIG. 9 is a schematic functional diagram of a second terminal device according to an embodiment of the present invention.

FIG. 9 is a schematic functional diagram of a second terminal device according to an embodiment of the present invention. As shown in FIG. 9, the second terminal device includes: an acquiring unit 901, a determining unit 902, a sending unit 903, a receiving unit 904, and a processing unit 905.

The acquiring unit 901 is configured to acquire second user instruction information.

It should be noted that, the second user instruction information is made by a second user, and the second user instruction information may include audio information of the second user or information of an action of operating the terminal device by the second user. The second terminal device is capable of acquiring the foregoing information sent by the user.

Specifically, the acquiring unit 901 may use an action performed by the second user or a sound made by the second user as the second user instruction information.

Further, the acquiring unit 901 may also acquire fingerprint information of the second user or other information that can uniquely identify the second user. In this case, the second user instruction information may further include information that can identify the second user, such as the fingerprint information of the second user.

It should be noted that, the information that is included in the second user instruction information and can identify the second user is acquired from the user by the terminal device. For example, the information is a voiceprint of the second user, a fingerprint of the second user, face informationof the second user, or a password of the second user.

It should be noted that, when the acquiring unit 901 acquires the action performed by the second user or information of the sound made by the second user, the acquiring unit 901 acquires related information that can be used to identify an identity of the second user. For example, the terminal device acquires voiceprint information of the second user while acquiring the audio information.

The determining unit 902 is configured to determine a second operation instruction according to the second user instruction information acquired by the acquiring unit 901.

The second operation instruction is used to instruct to execute, by the terminal device (i.e. a second terminal device), a first operation.

It should be noted that, the second operation instruction is an instruction used to instruct the second terminal device to hand over a first operation of a first terminal device to the second terminal device.

It should be noted that, the terminal device pre-stores correspondences between user instruction information and operation instructions.

Specifically, after the acquiring unit 901 acquires the second user instruction information, the determining unit 902 may search the pre-stored correspondences between user instruction information and operation instructions, and when finding a piece of user instruction information that is matched with the second user instruction information, may know the operation instruction corresponding to the second user instruction information, that is, the second operation instruction.

It should be noted that, when the pre-stored correspondences between user instruction information and operation instructions are searched according to the second user instruction information, if no user instruction information that is matched with the second user instruction information is found in the pre-stored correspondences between user instruction information and operation instructions, it indicates that the second user instruction information is invalid, and the terminal device may delete the second user instruction information directly.

The sending unit 903 is configured to send a second message to a central device.

The second message includes the second operation instruction.

It should be noted that, the second operation instruction is an instruction instructing the second terminal device to execute the first operation. The second operation instruction may refer to an instruction for handing over an operation, such as an operation of playing a video on the first terminal device, or an operation of playing music, or an operation of browsing a document, or an operation of controlling a game, to the second terminal device for execution.

Further, the second message further includes second user identity information.

It should be noted that, the second user identity information is information preset by the second terminal device, for uniquely identifying the second user.

It should be noted that, the second user identity information is set by the second terminal device for the second user. The process of determining the second user identity information by the second terminal device is the same as the process of determining first user identity information by the first terminal device, and is not repeated herein.

Further, the second terminal device may encapsulate the second message in an XML format, and send the second message in the XML format to the central device.

The receiving unit 904 is configured to receive a second control instruction sent by the central device.

The second control instruction is used to instruct the second terminal device to receive related information of the first operation sent by a first terminal device.

It should be noted that, this step occurs only after the determining unit 902 finds a first operation instruction that is matched with the second operation instruction.

In this case, the receiving unit 904 receives the second control instruction sent by the central device, instructing the second terminal device to receive, over an established connection, the related information of the first operation sent by the first terminal device, so that the first operation currently executed on the first terminal device is handed over to the second terminal device for execution.

The receiving unit 904 is further configured to receive, according to the second control instruction, the related information of the first operation sent by the first terminal device.

It should be noted that, at this time, because a connection has been established between the terminal devices, the receiving unit 904 only needs to receive, over the pre-established connection, the related information of the first operation sent by the first terminal device.

The processing unit 905 is configured to execute the first operation according to the related information of the first operation received by the receiving unit 904.

Specifically, after the receiving unit 904 receives the related information of the first operation sent by the first terminal device, the processing unit 905 executes the first operation on the second terminal device.

Figure 10:
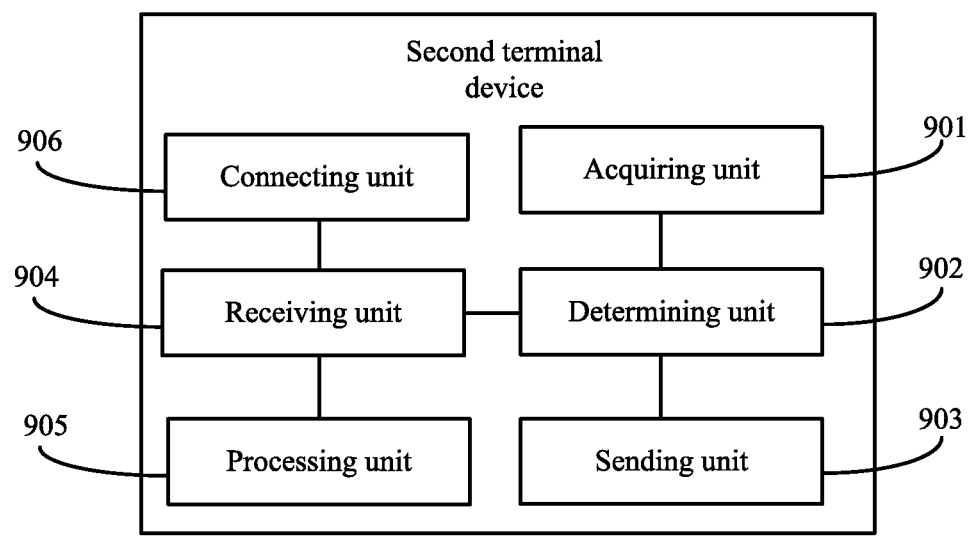
FIG. 10 is a schematic functional diagram of another second terminal device according to an embodiment of the present invention.

Further, as shown in FIG. 10, the terminal device further includes: a connecting unit 906.

In this case, the sending unit 903 is further configured to send a second request message to the central device. The second request message is a message for representing that the second terminal device acquires connection parameter information of a first terminal device.

The receiving unit 904 is further configured to receive a second response message sent by the central device. The connection parameter information of the first terminal device is carried in the second response message.

The connecting unit 906 is configured to establish a service connection with the first terminal device according to the second response message received by the receiving unit 904.

The embodiment of the present invention provides a terminal device. An acquiring unit acquires second user instruction information; a determining unit determines a second operation instruction according to the second user instruction information; a sending unit sends a second message to a central device; and after a receiving unit receives a second control instruction sent by the central device, the receiving unit receives, according to the second control instruction, related information of a first operation sent by a first terminal device, and finally executes the first operation. In this way, a user only needs to send second user instruction information to the terminal device (i.e. a second terminal device), and the terminal device can automatically identify the operation instruction. Therefore, operation steps of the user are simplified and user experience is further improved.

Figure 11:
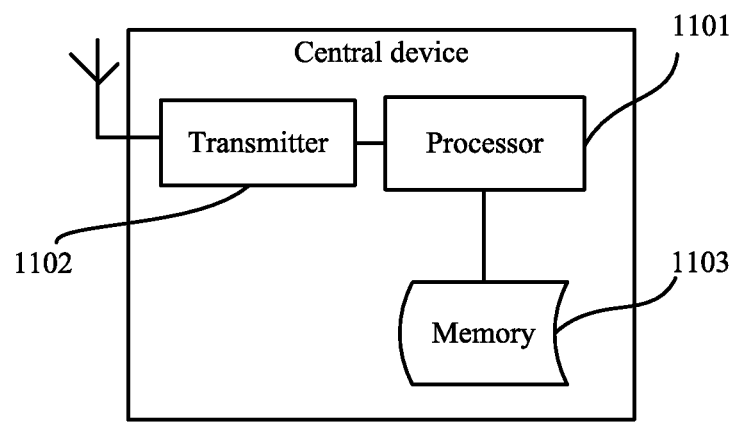
FIG. 11 is a schematic structural diagram of a central device according to an embodiment of the present invention.

FIG. 11 is a schematic structural diagram of another central device according to an embodiment of the present invention. As shown in FIG. 11, the central device includes: a processor 1101, a transmitter 1102, and a memory 1103.

The processor 1101 is configured to acquire a first message from a first terminal device.

The first message includes a first operation instruction and first state information. The first operation instruction is used to instruct to hand over a first operation currently executed by the first terminal device to a second terminal device for execution. The first state information is related information of the first operation currently executed by the first terminal device.

It should be noted that, the first terminal device is capable of joining a home network. Specifically, the first terminal device may be a smart phone, or a tablet computer, or a smart television, which is not limited by the present invention.

It should be noted that, the home network is a network formed by the first terminal device, the central device, a second terminal device, and other terminal devices. In the home network, a connection between terminal devices and between the central device and a terminal device may be a wireless network connection, for example, a Wireless Fidelity (Wi-Fi) network connection, and may also be a connection using a radio technology, for example, a Bluetooth technology. Further, a technology that can support data transmission between terminal devices and between the central device and a terminal device may be used, which is not limited by the present invention.

It should be noted that, the first operation may be an operation of playing a video on the first terminal device, or an operation of playing music, or an operation of browsing a document, or an operation of controlling a game, which is not limited by the present invention.

It should be noted that, the first state information may be a file size, a file format, a storage path, or other information related to the first operation.

For example, when the first operation is an operation of playing a video, the first state information may include a format, a storage path, video quality, and a video size of the video currently played.

Further, the first message further includes first user identity information.

It should be noted that, the first user identity information is information uniquely identifying a first user.

Further, a format of the first message may be XML (eXtensible Markup Language, extensible markup language).

It should be noted that, the format of the first message may also be another format, for example, a text identity or JSON (JavaScript Object Notation, a lightweight data exchange format), which is not limited by the present invention.

The processor 1101 is further configured to save the first message.

Specifically, after acquiring the first message, the processor 1101 may parse the message to obtain the first operation instruction. The first operation instruction is used to instruct to hand over the first operation which is being executed by the first terminal device to the second terminal device for execution. The processor 1101 cannot acquire, through the first terminal device, related information that is matched with the first operation instruction and that is used for determining the second terminal device, the processor 1101 needs to save the acquired first message into the memory 1103, for determining the second terminal device, and send the related information of the first operation to the second terminal device.

The processor 1101 is further configured to acquire a second message from the second terminal device.

The second message includes a second operation instruction. The second operation instruction is used to instruct to execute, by the second terminal device, the first operation.

It should be noted that, the second terminal device is capable of joining the home network. Specifically, the second terminal device may be a smart phone, or a tablet computer, or a smart television, which is not limited by the present invention.

Further, the second message further includes second user identity information.

The second user identity information is information uniquely identifying a second user.

It should be noted that, the second user and the first user may be a same user. In this case, the first user identity information and the second user identity information are the same. The second user and the first user may be not the same user. In this case, the first user identity information and the second user identity information are different. By using the second user identity information and the first user identity information, the central device may determine whether the two users are the same user.

Specifically, a format of the second message may be XML (eXtensible Markup Language, extensible markup language).

It should be noted that, the format of the second message may also be another format, for example, a text identity or JSON (JavaScript Object Notation, a lightweight data exchange format), which is not limited by the present invention.

It should be noted that, the second operation instruction included in the second message is used to instruct that the first operation is executed by the second terminal device, which indicates that the first operation executed by a first terminal device could be handed over, through the central device, to the second terminal device for execution. In this case, after receiving the second message, the central device may search, according to the second message, for stored information that is matched with the second message. If such information is stored, it indicates that the central device may hand over the first operation from the first terminal device to the second terminal device for execution. In this case, the central device hands over the first operation to the second terminal device for execution. If such information is not stored, it indicates that the central device cannot hand over the first operation from the first terminal device to the second terminal device for execution. In this case, the central device may return a handover failure message to the second terminal device, or the central device does not perform any processing. Therefore, the central device may not store the second message. The first terminal device is illustrated as another terminal device of the second terminal device.

The processor 1101 is further configured to search, according to the second operation instruction, for an operation instruction that is matched with the second operation instruction, among stored operation instructions in the memory 1103.

Specifically, after receiving the second message sent by the second terminal device, the processor 1101 compares the second operation instruction in the second message with each of all stored operation instructions to determine whether an operation instruction that is matched with the second operation instruction exists.

It should be noted that, the central device presets matching relationships between various operation instructions. Further, the central device presets a matching relationship between the first operation instruction and the second operation instruction. In this case, the processor 1101 searches, according to the second operation instruction, for the first operation instruction among the stored operation instructions.

Further, in a case in which the first message further includes the first user identity information and the second message further includes the second user identity information, the processor 1101 may further search, according to the second user identity information, for user identity information which is matched with the second user identity information among stored user identity information.

In a case in which the first message further includes the first user identity information and the second message further includes the second user identity information, to perform matching between the operation instructions more accurately, the processor 1101 may further match identities of users that send the operation instructions. This can avoid performing matching between operation instructions sent by different users, and improve accuracy of matching of the operation instructions.

Specifically, after receiving the second message sent by the second terminal device, the processor 1101 compares the second user identity information in the second message with each piece of all stored user identity information to determine whether user identity information that is matched with the second user identity information exists, that is, to determine whether user identity information same as the second user identity information exists in the stored user identity information.

It should be noted that, in a case in which the first message includes the first user identity information and the first operation instruction and the second message includes the second user identity information and the second operation instruction, the processor 1101 may first match the user identity information and then match the operation instructions, or may first match the operation instructions and then match the user identity information, or may match the user identity information and the operation instructions simultaneously, which is not limited by the present invention.

The transmitter 1102 is configured to send a first control instruction to the first terminal device and send a second control instruction to the second terminal device if the processor 1101 finds that the second operation instruction is matched with the first operation instruction.

The first control instruction is used to instruct the first terminal device to send the related information of the first operation to the second terminal device. The second control instruction is used to instruct the second terminal device to receive the related information of the first operation sent by the first terminal device.

Specifically, if the processor 1101 finds, among the stored operation instructions, that the first operation instruction is matched with the second operation instruction, the transmitter 1102 sends the first control instruction to the first terminal device, where the first control instruction is used to instruct the first terminal device to send the related information of the first operation to the second terminal device, and sends the second control instruction to the second terminal device, where the second control instruction is used to instruct the second terminal device to receive the related information of the first operation sent by the first terminal device.

Further, the processor 1101 finds that at least two first operation instructions are matched with the second operation instruction. In this case, the processor 1101 may select one first terminal device corresponding to either one of the first operation instructions, and the transmitter 1102 sends a first control message. The central device may also feed back information about the first terminal devices corresponding to the found at least two first operation instructions, and the second terminal device determines, from the first terminal devices corresponding to the at least two first operation instructions, a first terminal device to which the central device needs to send the first control message.

It should be noted that, at this time, a connection has been established between the terminal devices. After the processor 1101 finds the first operation instruction that is matched with the second operation instruction, the transmitter 1102 sends the first control instruction to the first terminal device, instructing the first terminal device to transmit content to be transmitted over the established connection between the first terminal device and the second terminal device, and the transmitter 1102 sends the second control instruction to the second terminal device, instructing the second terminal device to get ready for receiving, over the established connection between the first terminal device and the second terminal device, the content sent by the first terminal device, and finally, the first operation currently executed on the first terminal device is handed over to the second terminal device for execution.

Further, when the first message further includes the first user identity information and the second message further includes the second user identity information, the processor 1101 searches, according to the second user identity information, for user identity information that is matched with the second user identity information from stored user identity information, if the processor 1101 finds that the second operation instruction is matched with the first operation instruction and finds that the second user identity information is matched with the first user identity information, the transmitter 1102 sends the first control instruction to the first terminal device, and sends the second control instruction to the second terminal device.

That is, if identity authentication is required, not only matching on operation instructions need to be performed, but also matching on identity information needs to be performed. When both matching on the operation instructions and matching on the identity information succeed, the matching is considered as successful and further the first operation currently executed on the first terminal device can be handed over to the second terminal device.

It should be noted that, if the first user identity information included in the first message is matched with the second user identity information included in the second message, the first user identity information included in the first message and the second user identity information included in the second message are the same.

It should be noted that, if the processor 1101 finds no operation instruction that is matched with the second operation instruction among the stored operation instructions, the operation instruction is invalid. In this case, the second operation instruction may be deleted directly, or the transmitter 1102 sends a prompt message to the second terminal device, prompting that the central device does not store an operation instruction that is matched with the second operation instruction, and that the handover cannot be performed. Similarly, in a case in which identity authentication is required, if either the operation instruction or the identity information is not matched successfully or neither of the operation instruction and the identity information is matched successfully, the operation instruction may be deleted directly, or the transmitter 1102 sends a prompt message to the second terminal device, prompting that the matching performed by the central device fails, and that the handover cannot be performed.

It should be noted that, if the processor 1101 finds that at least two first operation instructions and at least two pieces of first user identity information are respectively matched with the second operation instruction and the second user identity information, for the processing method of the processor 1101, reference may be made to the processing method in which the central device finds that at least two first operation instructions are matched with the second operation instruction. Details are not repeated herein.

Figure 12:
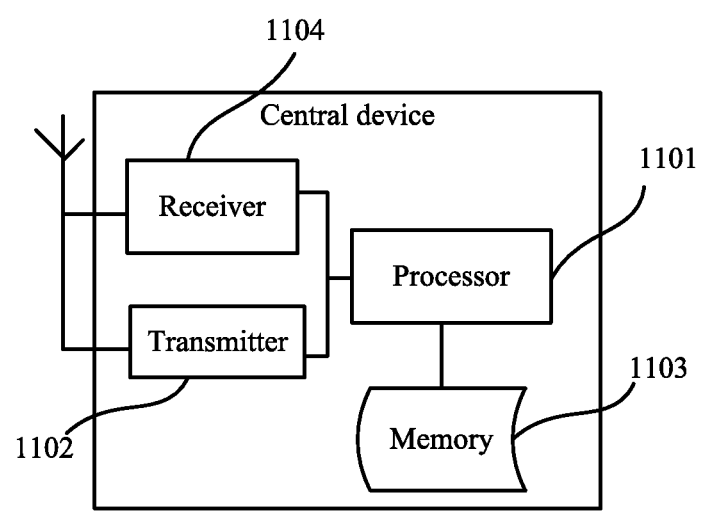
FIG. 12 is a schematic structural diagram of another central device according to an embodiment of the present invention.

Further, as shown in FIG. 12, the central device further includes: a receiver 1104.

In this case, the receiver 1104 is configured to receive device information of the first terminal device and device information of the second terminal device, where the device information of the first terminal device includes connection parameter information of the first terminal device, and the device information of the second terminal device includes connection parameter information of the second terminal device.

The processor 1101 is further configured to register the device information of the first terminal device and the device information of the second terminal device.

The embodiment of the present invention provides a central device. A processor receives a message sent by a first terminal device and a message sent by a second terminal device, and then matches operation instructions included in the messages; and after the matching succeeds, a transmitter sends a first control instruction to the first terminal device and sends a second control instruction to the second terminal device, so that an operation on the first terminal device is handed over to the second terminal device. In this way, in a multi-screen interaction process, a process of matching by a user can be changed to a process of matching by a central device, thereby simplifying operation steps of the user and improving user experience.

Figure 13:
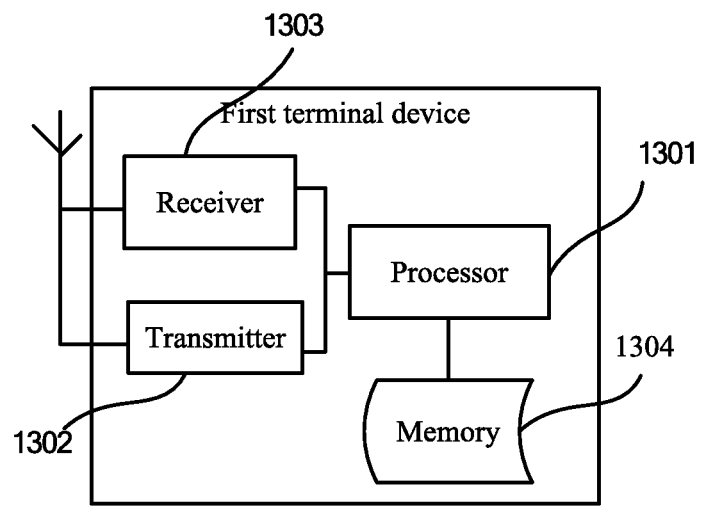
FIG. 13 is a schematic structural diagram of a first terminal device according to an embodiment of the present invention.

FIG. 13 is a schematic structural diagram of a terminal device according to an embodiment of the present invention. As shown in FIG. 13, the terminal device includes: a processor 1301, a transmitter 1302, a receiver 1303, and a memory 1304.

The processor 1301 is configured to acquire first user instruction information.

It should be noted that, the first user instruction information is made by a first user, and the information may include audio information of the first user or information of an action of operating the terminal device by the first user. The terminal device is capable of acquiring the foregoing information sent by the user.

Specifically, the processor 1301 may use an action performed by the first user or a sound made by the first user as the first user instruction information.

Further, the processor 1301 may also acquire fingerprint information of the first user or other information that can uniquely identify the first user. In this case, the first user instruction information may further include information that can identify the first user, such as the fingerprint information of the first user.

It should be noted that, the information that is included in the first user instruction information and can identify the first user is acquired from the user by the terminal device. For example, the information is a voiceprint of the first user, a fingerprint of the first user, face information of the first user, or a password of the first user.

When the processor 1301 acquires the action performed by the first user or information of the sound made by the first user, the terminal device acquires related information that can be used to identify an identity of the first user. For example, the terminal device acquires voiceprint information of the first user while acquiring the audio information.

The processor 1301 is further configured to determine a first operation instruction according to the first user instruction information.

The first operation instruction is used to instruct to hand over a first operation currently executed by the terminal device (i.e. a first terminal device) to a second terminal device for execution.

It should be noted that, the memory 1304 pre-stores correspondences between user instruction information and operation instructions.

Specifically, after acquiring the first user instruction information, the processor 1301 may search the pre-stored correspondences between user instruction information and operation instructions, and when finding a piece of user instruction information that is matched with the first user instruction information, may know the operation instruction corresponding to the first user instruction information, that is, the first operation instruction.

It should be noted that, when the pre-stored correspondences between user instruction information and operation instructions are searched according to the first user instruction information, if no user instruction information that is matched with the first user instruction information is found in the pre-stored correspondences between user instruction information and operation instructions, it indicates that the first user instruction information is invalid, and the terminal device may delete the first user instruction information directly.

The transmitter 1302 is configured to send a first message to a central device.

The first message includes the first operation instruction and first state information. The first state information is related information of the first operation currently executed by the first terminal device.

It should be noted that, the first operation may be an operation of playing a video on the first terminal device, or an operation of playing music, or an operation of browsing a document, or an operation of controlling a game, which is not limited by the present invention.

It should be noted that, the first state information may be a file size, a file format, a storage path, or other information related to the first operation.

For example, when the first operation is an operation of playing a video, the first state information includes a format, a storage path, video quality, and a video size of the current video.

Further, the first message further includes first user identity information.

It should be noted that, the first user identity information is information preset by the memory 1304 of the first terminal device, for uniquely identifying the first user.

It should be noted that, the first user identity information is set by the terminal device for the first user, and is matched with information that can uniquely identify the first user and that is in the first user instruction information. That is, in the terminal device, a correspondence between the first user identity information and the information that can uniquely identify the first user and that is in the first user instruction information is pre-stored. For example, the information that can uniquely identify the first user and that is in the first user instruction information is the fingerprint information of the first user, or the voiceprint information of the first user, or face information of the first user, or password information set by the first user. Therefore, the terminal device pre-stores a correspondence between the first user identity information and the fingerprint information of the first user, or the voiceprint information of the first user, or the face information of the first user, or the password information set by the first user.

Specifically, after the processor 1301 acquires the first operation instruction, the processor 1301 may determine the first user identity information according to the information that can uniquely identify the first user and that is in the first user instruction information, and therefore, may use the first operation instruction, the first state information, and the first user identity information as the first message that is sent by the transmitter 1302 to the central device.

Further, the terminal device may encapsulate the first message in an XML format, and send the first message in the XML format to the central device.

The receiver 1303 is configured to receive a first control instruction sent by the central device.

The first control instruction is used to instruct the first terminal device to send the related information of the first operation to the second terminal device.

It should be noted that, this step occurs only after the processor 1301 finds the first operation instruction that is matched with the second operation instruction.

In this case, the receiver 1303 receives the first control instruction sent by the central device, instructing the terminal device to transmit content to be transmitted over an established connection, so that the first operation currently executed on the terminal device is handed over to the second terminal device.

It should be noted that, the terminal device in the embodiment of the present invention refers to the first terminal device.

The transmitter 1302 is further configured to send the related information of the first operation to the second terminal device according to the first control instruction.

It should be noted that, at this time, because a connection has been established between the terminal devices, the transmitter 1302 only needs to send the related information of the first operation to the second terminal device over the pre-established connection.

Further, the transmitter 1302 is further configured to send a first request message to the central device. The first request message is a message for representing that the first terminal device acquires connection parameter information of a second terminal device.

The receiver 1303 is further configured to receive a first response message sent by the central device. The connection parameter information of the second terminal device is carried in the first response message.

The processor 1301 is further configured to establish a service connection with the second terminal device according to the first response message.

The embodiment of the present invention provides a terminal device. A processor acquires first user instruction information, and determines a first operation instruction according to the first user instruction information; a transmitter sends a first message to a central device; and after a receiver receives a first control instruction sent by the central device, the transmitter sends related information of a first operation to a second terminal device according to the first control instruction. In this way, a user does not need to perform complicated operations step by step on an operation interface of the terminal device, and only needs to send first user instruction information to the terminal device, and the terminal device can automatically identify the operation instruction. Therefore, operation steps of the user are simplified and user experience is further improved.

Figure 14:
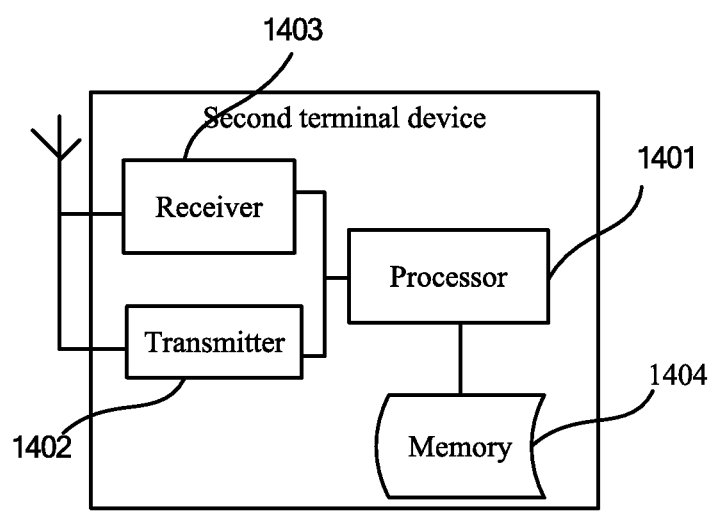
FIG. 14 is a schematic structural diagram of a second terminal device according to an embodiment of the present invention.

FIG. 14 is a schematic structural diagram of a second terminal device according to an embodiment of the present invention. As shown in FIG. 14, the terminal device includes: a processor 1401, a transmitter 1402, a receiver 1403, and a memory 1404.

The processor 1401 is configured to acquire second user instruction information.

It should be noted that, the second user instruction information is made by a second user, and the information may include audio information of the second user or information of an action of operating the terminal device by the second user. The second terminal device is capable of acquiring the foregoing information sent by the user.

Specifically, the processor 1401 may use an action performed by the second user or a sound made by the second user as the second user instruction information.

Further, the processor 1401 may also acquire fingerprint information of the second user or other information that can uniquely identify the second user. In this case, the second user instruction information may further include information that can identify the second user, such as the fingerprint information of the second user.

It should be noted that, the information that is included in the second user instruction information and can identify the second user is acquired from the user by the terminal device. For example, the information is a voiceprint of the second user, a fingerprint of the second user, face information of the second user, or a password of the second user.

It should be noted that, when the processor 1401 acquires the action performed by the second user or information of the sound made by the second user, the processor 1401 acquires related information that can be used to identify an identity of the second user. For example, the terminal device acquires voiceprint information of the second user while acquiring the audio information.

The processor 1401 is further configured to determine a second operation instruction according to the second user instruction information.

The second operation instruction is used to instruct to execute, by the terminal device (i.e. a second terminal device), a first operation.

It should be noted that, the second operation instruction is an instruction used to instruct the second terminal device to hand over a first operation of a first terminal device to the second terminal device.

It should be noted that, the memory 1404 pre-stores correspondences between user instruction information and operation instructions.

Specifically, after acquiring the second user instruction information, the processor 1401 may search the pre-stored correspondences between user instruction information and operation instructions, and when finding a piece of user instruction information that is matched with the second user instruction information, may know the operation instruction corresponding to the second user instruction information, that is, the second operation instruction.

It should be noted that, when the pre-stored correspondences between user instruction information and operation instructions are searched according to the second user instruction information, if no user instruction information that is matched with the second user instruction information is found in the pre-stored correspondences between user instruction information and operation instructions, it indicates that the second user instruction information is invalid, and the terminal device may delete the second user instruction information directly.

The transmitter 1402 is configured to send a second message to a central device.

The second message includes the second operation instruction.

It should be noted that, the second operation instruction is an instruction instructing the second terminal device to execute the first operation. The second operation instruction may refer to an instruction for handing over an operation, such as an operation of playing a video on the first terminal device, or an operation of playing music, or an operation of browsing a document, or an operation of controlling a game, to the second terminal device for execution.

Further, the second message further includes second user identity information.

It should be noted that, the second user identity information is information preset by the second terminal device, for uniquely identifying the second user.

It should be noted that, the second user identity information is set by the second terminal device for the second user. The process of determining the second user identity information by the second terminal device is the same as the process of determining first user identity information by the first terminal device, and is not repeated herein.

Further, the second terminal device may encapsulate the second message in an XML format, and send the second message in the XML format to the central device.

The receiver 1403 is configured to receive a second control instruction sent by the central device.

The second control instruction is used to instruct the second terminal device to receive related information of the first operation sent by a first terminal device.

It should be noted that, this step occurs only after the processor 1401 finds a first operation instruction that is matched with the second operation instruction.

In this case, the receiver 1403 receives the second control instruction sent by the central device, instructing the second terminal device to receive, over an established connection, the related information of the first operation sent by the first terminal device, so that the first operation currently executed on the first terminal device is handed over to the second terminal device for execution.

The receiver 1403 is further configured to receive, according to the second control instruction, the related information of the first operation sent by the first terminal device.

It should be noted that, at this time, because a connection has been established between the terminal devices, the receiver 1403 only needs to receive, over the pre-established connection, the related information of the first operation sent by the first terminal device.

The processor 1401 is further configured to execute the first operation according to the related information of the first operation received by the receiver 1403.

Specifically, after the receiver 1403 receives the related information of the first operation sent by the first terminal device, the processor 1401 executes the first operation on the second terminal device.

Further, the transmitter 1402 is further configured to send a second request message to the central device. The second request message is a message for representing that the second terminal device acquires connection parameter information of a first terminal device.

The receiver 1403 is further configured to receive a second response message sent by the central device. The connection parameter information of the first terminal device is carried in the second response message.

The processor 1401 is further configured to establish a service connection with the first terminal device according to the second response message received by the receiver 1403.

The embodiment of the present invention provides a terminal device. A processor acquires second user instruction information, and determines a second operation instruction according to the second user instruction information; a transmitter sends a second message to a central device; and after a receiver receives a second control instruction sent by the central device, the receiver receives, according to the second control instruction, related information of a first operation sent by a first terminal device, and finally executes the first operation. In this way, a user only needs to send second user instruction information to the second terminal device, and the second terminal device can automatically identify the operation instruction. Therefore, operation steps of the user are simplified and user experience is further improved.

Figure 15:
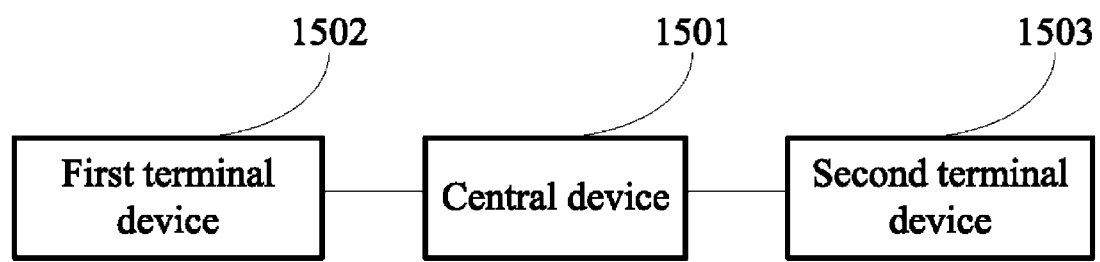
FIG. 15 is a schematic structural diagram of a multi-screen interaction system according to an embodiment of the present invention.

An embodiment of the present invention provides a multi-screen interaction system. As shown in FIG. 15, the multi-screen interaction system includes: a central device 1501, a first terminal device 1502, and a second terminal device 1503.

The central device 1501 is the central device in the foregoing embodiments.

The first terminal device 1502 is the first terminal device in the foregoing embodiments.

The second terminal device 1503 is the second terminal device in the foregoing embodiments.

According to the multi-screen interaction method, devices, and system that are provided by embodiments of the present invention, a central device receives a message sent by a first terminal device and a message sent by a second terminal device, then matches operation instructions included in the messages, and after the matching succeeds, sends a first control instruction to the first terminal device and sends a second control instruction to the second terminal device, so that an operation on the first terminal device is handed over to the second terminal device. In this way, in a multi-screen interaction process, a process of matching by a user can be changed to a process of matching by a central device, thereby simplifying operation steps of the user and improving user experience.

In the several embodiments provided in the present application, it should be understood that the disclosed system, devices, and method may be implemented in other manners. For example, the described device embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the devices or units may be implemented in electronic, mechanical, or other forms.

The units described as separate parts may or may not be physically separate, and parts displayed as units may or may not be physical units, may be located in one position, or may be distributed on a plurality of network elements. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, a network device, or the like) to perform a part of the steps of the methods described in the embodiments of the present invention. The foregoing storage medium includes: any medium that can store program code, such as a USB flash drive, a removable hard disk, a read-only memory (ROM for short), a random access memory (RAM for short), a magnetic disk, or an optical disc.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, as long as such modifications or replacements do not make the essence of corresponding technical solutions to depart from the spirit and scope of the technical solutions of the embodiments of the present invention.

What is claimed is:

1. A method, comprising:
   receiving, by a receiver of a central device, a first message from a first terminal device, wherein the first message comprises a first operation instruction and first state information, wherein the first operation instruction requests that a first operation that is currently being executed by the first terminal device subsequently be executed by a second terminal device and not the first terminal device, wherein the first state information is information related to the first operation that is currently being executed by the first terminal device, and wherein the first terminal device is wirelessly connected to the central device using a wireless network;
   parsing, by the central device, the first message to acquire the first operation instruction and the first state information;
   storing, by the central device, the first message in a memory of the central device when it is determined that an operation instruction matching the first operation instruction has not previously been stored in the memory of the central device;
   receiving, by the central device, a second message from a second terminal device, wherein the second message comprises a second operation instruction, wherein the second operation instruction requests that the first operation that is currently being executed by the first terminal device subsequently be executed by the second terminal device and not the first terminal device, and wherein the second terminal device is wirelessly connected to the central device using the wireless network;
   parsing, by the central device, the second message to acquire the second operation instruction;
   searching, by the central device, among stored operation instructions for an operation instruction that is matched with the second operation instruction, the searching being performed according to the second operation instruction, wherein the stored operation instructions are stored in the memory of the central device, and wherein a determination regarding whether one of the stored operation instructions is matched with the second operation instruction is made according to a preset matching relationship that is stored in the memory of the central device;
   determining that the stored first operation instruction matches the second operation instruction; and
   sending, by the central device, a first control instruction to the first terminal device and sending a second control instruction to the second terminal device when it is found that the second operation instruction is matched with the first operation instruction, wherein the first control instruction instructs the first terminal device to send the information related to the first operation to the second terminal device, and wherein the second control instruction is used to instruct the second terminal device that the information related to the first operation will subsequently be sent to the second terminal device from the first terminal device, so that the first operation that is currently being executed by the first terminal device is subsequently executed by the second terminal device and not the first terminal device.

2. The method according to claim 1,
   wherein the first message further comprises first user identity information, and the second message further comprises second user identity information;
   wherein, before sending the first control instruction to the first terminal device and the second control instruction to the second terminal device, the method further comprises searching, by the central device according to the second user identity information, for user identity information that matches the second user identity information among stored user identity information; and wherein sending the first control instruction to the first terminal device and the second control instruction to the second terminal device comprises sending the first control instruction to the first terminal device and sending the second control instruction to the second terminal device when it is found that the second operation instruction is matched with the stored first operation instruction and it is found that the second user identity information is matched with the first user identity information.

3. The method according to claim 1, wherein, before receiving the first message from the first terminal device, the method further comprises receiving device information of the first terminal device and device information of the second terminal device and performing registering on the device information of the first terminal device and the device information of the second terminal device, wherein the device information of the first terminal device comprises connection parameter information of the first terminal device, and the device information of the second terminal device comprises connection parameter information of the second terminal device.

4. The method according to claim 3, wherein, before receiving the first message from the first terminal device, the method further comprises:
   receiving a first request message sent by the first terminal device, wherein the first request message is a message for representing that the first terminal device acquires connection parameter information of the second terminal device; and
   sending a first response message to the first terminal device, wherein the connection parameter information of the second terminal device is carried in the first response message.

5. The method according to claim 3, wherein, before receiving the first message from the first terminal device, the method further comprises:
   receiving a second request message sent by the second terminal device, wherein the second request message is a message for representing that the second terminal device acquires the connection parameter information of the first terminal device; and
   sending a second response message to the second terminal device, wherein the connection parameter information of the first terminal device is carried in the second response message.

6. A method performed by a first terminal device, the method comprising:
   acquiring first user instruction information;
   determining, by searching a plurality of operation instructions stored on the first terminal device, a first operation instruction according to the first user instruction information, wherein the first operation instruction requests that a first operation that is currently being executed by the first terminal device be executed by a second terminal device and not the first terminal device;
   sending a first message to a central device, wherein the first message comprises the determined first operation instruction and first state information, wherein the first state information is related to the first operation that is currently being executed by the first terminal device, wherein the first terminal device, the second terminal device, and the central device are separate network devices that are connected to a same network;
   receiving a first control instruction generated and sent by the central device, wherein the first control instruction instructs the first terminal device to send the information related to the first operation to the second terminal device; and
   sending the information related to the first operation to the second terminal device according to the first control instruction, to hand over the first operation currently executed by the first terminal device to the second terminal device for execution, and stopping the execution of the first operation.

7. The method according to claim 6, wherein the first message further comprises a first user identity information and, before sending the first message to the central device, the method further comprises:
   acquiring user information, wherein the user information is information input by a user for identifying the user; and
   determining the first user identity information according to the user information.

8. The method according to claim 6, wherein, before acquiring the first user instruction information, the method further comprises sending device information to the central device, wherein the device information comprises connection parameter information of the first terminal device.

9. The method according to claim 8, wherein, before acquiring the first user instruction information, the method further comprises:
   sending a first request message to the central device, wherein the first request message comprises a message for representing that the first terminal device acquires connection parameter information of a second terminal device;
   receiving a first response message sent by the central device, wherein the connection parameter information of the second terminal device is carried in the first response message; and
   establishing a service connection with the second terminal device according to the first response message.

10. A method performed by a second terminal device, the method comprising:
    acquiring second user instruction information;
    determining, by searching a plurality of operation instructions stored on the second terminal device, a second operation instruction according to the second user instruction information, wherein the second operation instruction requests that a first operation that is currently being executed by a first terminal device subsequently be executed by the second terminal device;
    wirelessly sending a second message to a central device, wherein the second message comprises the second operation instruction;
    wirelessly receiving a second control instruction generated and sent by the central device, wherein the second control instruction instructs the second terminal device that information related to the first operation will subsequently be sent to the second terminal device from the first terminal device;
    wirelessly receiving, according to the second control instruction, the information related to the first operation from the first terminal device; and
    executing the first operation according to the information related to the first operation.

11. The method according to claim 10, wherein the second message further comprises a second user identity information and, before sending the second message to the central device, the method further comprises:

acquiring user information, wherein the user information is information input by a user for identifying the user; and determining the second user identity information according to the user information.

12. The method according to claim 10, wherein, before acquiring the second user instruction information, the method further comprises sending device information to the central device, wherein the device information comprises connection parameter information of the second terminal device.

13. The method according to claim 12, wherein, before acquiring the second user instruction information, the method further comprises:
sending a second request message to the central device, wherein the second request message comprises a message for representing that the second terminal device acquires connection parameter information of a first terminal device;
receiving a second response message sent by the central device, wherein the connection parameter information of the first terminal device is carried in the second response message; and
establishing a service connection with the first terminal device according to the second response message.

14. A central device, comprising:
a non-transitory memory storing executable software;
a receiver, configured to:
receive a first message from a first terminal device, wherein the first message comprises a first operation instruction and first state information, wherein the first operation instruction requests that a first operation that is currently being executed by the first terminal device be subsequently executed by a second terminal device and not the first terminal device, and wherein the first state information state information of the first operation that is currently being executed by the first terminal device; and
receive a second message from a second terminal device, wherein the second message comprises a second operation instruction, wherein the second operation instruction requests that the first operation that is currently being executed by the first terminal device be subsequently executed by the second terminal device and not the first terminal device, and wherein the first terminal device, the second terminal device, and the central device are separate devices that are wirelessly connected to a same network; and
a processor coupled to the memory to execute the software in order to:
parse the first message to acquire the first operation instruction and the first state information;
store the first message in the non-transitory memory when it is determined that an operation instruction matching the first operation instruction has not previously been stored in the non-transitory memory;
parse the second message to acquire the second operation instruction;
search among stored operation instructions for an operation instruction that is matched with the second operation instruction, the search being performed according to the second operation instruction, the stored operation instructions being stored in the non-transitory memory, wherein a determination regarding whether one of the stored operation instructions is matched with the second operation instruction is made according to a preset matching relationship that is stored in the non-transitory memory;
determining that the stored first operation instruction matches the second operation instruction; and
a transmitter, configured to wirelessly send a first control instruction to the first terminal device and wirelessly send a second control instruction to the second terminal device when the processor finds that the second operation instruction is matched with the stored first operation instruction, wherein the first control instruction instructs the first terminal device to send the related information of the first operation to the second terminal device, and the second control instruction instructs the second terminal device that the related information of the first operation will be sent to the second terminal device from the first terminal device, so that the first operation that is currently being executed by the first terminal device is subsequently executed by the second terminal device and not the first terminal device.

15. The central device according to claim 14, wherein
the first message further comprises first user identity information, and the second message further comprises second user identity information;
the processor is programmed to search, according to the second user identity information, for user identity information that matches the second user identity information among stored user identity information; and
the transmitter is configured to, when the processor finds that the second operation instruction matches the first operation instruction and finds that the second user identity information matches first user identity information, send the first control instruction to the first terminal device and send the second control instruction to the second terminal device.

16. The central device according to claim 14, further comprising a receiver, which which is configured to receive device information of the first terminal device and device information of the second terminal device, wherein the device information of the first terminal device comprises connection parameter information of the first terminal device, and the device information of the second terminal device comprises connection parameter information of the second terminal device; and
wherein the processor is further programmed to register the device information of the first terminal device and the device information of the second terminal device.

17. The central device according to claim 16, wherein
the receiver is further configured to receive a first request message sent by the first terminal device, wherein the first request message is a message for representing that the first terminal device acquires connection parameter information of a second terminal device; and
the transmitter is further configured to send a first response message to the first terminal device, wherein the connection parameter information of the second terminal device is carried in the first response message.

18. The central device according to claim 16, wherein
the receiver is further configured to receive a second request message sent by the second terminal device, wherein the second request message is a message for representing that the second terminal device acquires connection parameter information of the first terminal device; and
the transmitter is further configured to send a second response message to the second terminal device, wherein the connection parameter information of the first terminal device is carried in the second response message.

19. A first terminal device, comprising:
a non-transitory memory storing executable software; and
a processor coupled to the memory to execute the software to:
determine, by searching a plurality of operation instructions stored on the first terminal device, a first operation instruction according to first user instruction information, wherein the first operation instruction requests that a first operation that is currently being executed by the first terminal device subsequently be executed by a second terminal device and not the first terminal device;
a transmitter, configured to send a first message through a wireless network to a central device, wherein the first message comprises the first operation instruction and first state information, wherein the first state information is related information of the first operation currently executed by the first terminal device; and
a receiver, configured to receive a first control instruction generated and sent by the central device through the wireless network, wherein the first control instruction instructs the first terminal device to send the related information of the first operation to the second terminal device, wherein the transmitter is further configured to send the related information of the first operation to the second terminal device according to the first control instruction, to hand over the first operation from the first terminal device to the second terminal device.

20. The first terminal device according to claim 19, wherein the first message further comprises first user identity information and wherein the processor is further programmed to acquire user information input by a user for identifying the user and to determine the first user identity information according to the user information.

21. The first terminal device according to claim 19, wherein the transmitter is further configured to send device information to the central device, wherein the device information comprises connection parameter information of the first terminal device.

22. The first terminal device according to claim 21, wherein
the transmitter is further configured to send a first request message to the central device, wherein the first request message is a message for representing that the first terminal device acquires connection parameter information of a second terminal device;
the receiver is further configured to receive a first response message sent by the central device, wherein the connection parameter information of the second terminal device is carried in the first response message; and
the processor is further programmed to establish a service connection with the second terminal device according to the first response message.

23. A second terminal device, comprising:
a non-transitory memory storing executable software;
a processor coupled to the memory to execute the software to:
acquire second user instruction information; and
determine, by searching a plurality of operation instructions stored on the second terminal device, a second operation instruction according to the second user instruction information, wherein the second operation instruction requests that a first operation that is currently being executed by a first terminal device subsequently be executed by the second terminal device;
a transmitter, configured to send a second message to a central device, wherein the second message comprises the second operation instruction;
a receiver, configured to receive a second control instruction generated and sent by the central device, wherein the second control instruction instructs the second terminal device that related information of the first operation will subsequently be sent to the second terminal device from the first terminal device;
wherein the receiver is further configured to receive, according to the second control instruction, the related information of the first operation from the first terminal device; and
wherein the processor is further configured to execute the first operation according to the related information of the first operation received by the receiver
wherein the second terminal device, the central device, and the first terminal device are different devices that are wirelessly connected to a same wireless network.

24. The second terminal device according to claim 23, wherein the second message further comprises second user identity information and wherein the processor is programmed to execute the software to acquire user information and to determine the second user identity information according to the user information, wherein the user information is information input by a user for identifying the user.

25. The second terminal device according to claim 23, wherein the transmitter is further configured to send device information to the central device, wherein the device information comprises connection parameter information of the second terminal device.

26. The second terminal device according to claim 25, wherein:
the transmitter is further configured to send a second request message to the central device, wherein the second request message is a message for representing that the second terminal device acquires connection parameter information of the first terminal device;
the receiver is further configured to receive a second response message sent by the central device, wherein the connection parameter information of the first terminal device is carried in the second response message; and
the processor is further programmed to establish a service connection with the first terminal device according to the second response message received by the receiver.

* * * * *

UNITED STATES PATENT AND TRADEMARK OFFICE
CERTIFICATE OF CORRECTION

PATENT NO. : 9,986,044 B2
APPLICATION NO. : 14/536279
DATED : May 29, 2018
INVENTOR(S) : Qiulin Chen Page 1 of 1

It is certified that error appears in the above-identified patent and that said Letters Patent is hereby corrected as shown below:

In the Claims

In Column 46, Line 38, Claim 16, delete "which which" and insert --which--.

Signed and Sealed this
Thirty-first Day of July, 2018

Andrei Iancu
*Director of the United States Patent and Trademark Office*